(12) United States Patent
Miralles

(10) Patent No.: US 11,555,672 B2
(45) Date of Patent: Jan. 17, 2023

(54) MULTIMODE UNMANNED AERIAL VEHICLE

(71) Applicant: AEROVIRONMENT, INC., Simi Valley, CA (US)

(72) Inventor: Carlos Thomas Miralles, Burbank, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 311 days.

(21) Appl. No.: 16/677,348

(22) Filed: Nov. 7, 2019

(65) Prior Publication Data
US 2020/0256644 A1 Aug. 13, 2020

Related U.S. Application Data

(63) Continuation of application No. 16/119,872, filed on Aug. 31, 2018, now Pat. No. 10,494,093, which is a
(Continued)

(51) Int. Cl.
*F41G 7/22* (2006.01)
*F41G 9/00* (2006.01)
(Continued)

(52) U.S. Cl.
CPC ............ *F41G 7/2246* (2013.01); *B64C 39/00* (2013.01); *B64C 39/024* (2013.01); *F41G 7/008* (2013.01); *F41G 7/2206* (2013.01); *F41G 7/2253* (2013.01); *F41G 7/2293* (2013.01); *F41G 9/002* (2013.01); *G05D 1/0094* (2013.01); *G05D 1/12* (2013.01); *G08G 5/0069* (2013.01); *B64C 2201/121* (2013.01); *B64C 2201/141* (2013.01)

(58) Field of Classification Search
CPC ...... F41G 7/2246; F41G 7/008; F41G 7/2253; F41G 7/2206; F41G 7/2293; F41G 9/002; B64C 39/024; B64C 39/00; B64C 2201/141; B64C 2201/121; G05D 1/12; G05D 1/0094; G08G 5/0069
See application file for complete search history.

(56) References Cited

U.S. PATENT DOCUMENTS 2,444,332 A 6/1948 Earl et al.
2,512,069 A 6/1950 Mull
(Continued)

FOREIGN PATENT DOCUMENTS

CA 2659111 C 7/2011
CN 85104530 A 1/1987
(Continued)

OTHER PUBLICATIONS

IP.com Search Results (Year: 2020).*
(Continued)

*Primary Examiner* — Jeff A Burke
*Assistant Examiner* — Kyle T Johnson
(74) *Attorney, Agent, or Firm* — Concept IP LLP; Michael Zarrabian; Eric Aagaard

(57) ABSTRACT

A system comprising an unmanned aerial vehicle (UAV) configured to transition from a terminal homing mode to a target search mode, responsive to an uplink signal and/or an autonomous determination of scene change.

20 Claims, 9 Drawing Sheets

Related U.S. Application Data continuation of application No. 14/832,688, filed on Aug. 21, 2015, now Pat. No. 10,222,177, which is a continuation of application No. 12/698,995, filed on Feb. 2, 2010, now Pat. No. 9,127,908.

(60) Provisional application No. 61/241,001, filed on Sep. 9, 2009, provisional application No. 61/240,985, filed on Sep. 9, 2009, provisional application No. 61/240,987, filed on Sep. 9, 2009, provisional application No. 61/241,017, filed on Sep. 9, 2009, provisional application No. 61/240,996, filed on Sep. 9, 2009, provisional application No. 61/149,304, filed on Feb. 2, 2009.

(51) Int. Cl.

| | | |
|---|---|---|
| G08G 5/00 | (2006.01) | |
| B64C 39/00 | (2006.01) | |
| F41G 7/00 | (2006.01) | |
| B64C 39/02 | (2006.01) | |
| G05D 1/00 | (2006.01) | |
| G05D 1/12 | (2006.01) | |

(56) References Cited

U.S. PATENT DOCUMENTS

| | | |
|---|---|---|
| 2,750,133 A | 6/1956 | Lebold |
| 2,752,110 A | 6/1956 | Peterson |
| 2,996,011 A | 8/1961 | Dunlap |
| 3,069,115 A | 12/1962 | John |
| 3,083,936 A | 4/1963 | Rethorst |
| 3,147,939 A | 9/1964 | Alick |
| 3,223,361 A | 12/1965 | Girard |
| 3,262,391 A | 7/1966 | Shober |
| 3,347,466 A | 10/1967 | Nichols |
| 3,415,467 A | 12/1968 | Barringer |
| 3,789,353 A | 1/1974 | Hunter et al. |
| 3,790,103 A | 2/1974 | Peoples |
| 3,916,560 A | 11/1975 | Becker |
| 3,939,967 A | 2/1976 | Tenney et al. |
| 4,022,403 A | 5/1977 | Chiquet |
| 4,076,187 A | 2/1978 | Metz |
| 4,090,684 A | 5/1978 | Look et al. |
| 4,106,727 A | 8/1978 | Ortell |
| 4,165,849 A | 8/1979 | Fox |
| 4,209,147 A | 6/1980 | Jones |
| 4,277,038 A | 7/1981 | Yates et al. |
| 4,296,894 A | 10/1981 | Schnabele et al. |
| 4,336,914 A | 6/1982 | Thomson |
| 4,354,646 A | 10/1982 | Raymer |
| 4,364,530 A | 12/1982 | Ripley-Lotee et al. |
| 4,364,531 A | 12/1982 | Knoski |
| 4,373,688 A | 2/1983 | Topliffe |
| 4,383,663 A | 5/1983 | Nichols |
| 4,408,538 A | 10/1983 | Deffayet et al. |
| 4,410,151 A | 10/1983 | Hoppner et al. |
| 4,530,476 A | 7/1985 | Thurber, Jr. et al. |
| 4,541,593 A | 9/1985 | Cabrol |
| 4,553,718 A | 11/1985 | Pinson |
| 4,565,340 A | 1/1986 | Bains |
| 4,568,040 A | 2/1986 | Metz |
| 4,590,862 A | 5/1986 | Grabarek et al. |
| 4,664,338 A | 5/1987 | Steuer et al. |
| 4,708,304 A | 11/1987 | Wedertz et al. |
| H400 H | 1/1988 | Hammon et al. |
| 4,730,793 A | 3/1988 | Thurber, Jr. et al. |
| 4,735,148 A | 4/1988 | Holtzman et al. |
| 4,841,867 A | 6/1989 | Garrett |
| 4,842,218 A | 6/1989 | Groutage et al. |
| 4,903,917 A | 2/1990 | Peller et al. |
| 4,958,571 A | 9/1990 | Puckett |
| 4,964,593 A | 10/1990 | Kranz |
| 4,990,921 A | 2/1991 | Chisholm |
| 4,997,144 A | 3/1991 | Wolff et al. |
| D317,003 S | 5/1991 | Tribe et al. |
| 5,074,493 A | 12/1991 | Greenhalgch |
| 5,106,033 A | 4/1992 | Phan |
| 5,108,051 A | 4/1992 | Montet et al. |
| 5,112,006 A | 5/1992 | Palmer |
| 5,115,711 A | 5/1992 | Bushagour et al. |
| 5,118,052 A | 6/1992 | Alvarez Calderon F |
| 5,141,175 A | 8/1992 | Harris |
| 5,154,370 A | 10/1992 | Cox et al. |
| 5,322,243 A | 6/1994 | Stoy |
| 5,370,032 A | 12/1994 | Reuche et al. |
| 5,417,393 A | 5/1995 | Klestadt |
| 5,458,041 A | 10/1995 | Sun et al. |
| 5,458,042 A | 10/1995 | Cante |
| 5,566,073 A | 10/1996 | Margolin |
| 5,581,250 A | 12/1996 | Khvilivitzky |
| 5,582,364 A | 12/1996 | Trulin et al. |
| 5,615,846 A | 4/1997 | Shmoldas et al. |
| 5,671,138 A | 9/1997 | Bessacini et al. |
| 5,671,899 A | 9/1997 | Nicholas et al. |
| 5,722,618 A | 3/1998 | Jacobs et al. |
| 5,780,766 A | 7/1998 | Schroppel |
| 5,806,791 A | 9/1998 | Hatalsky et al. |
| 5,855,339 A | 1/1999 | Mead et al. |
| 5,874,727 A | 2/1999 | Harraeus et al. |
| 5,884,872 A | 3/1999 | Greenhalgh |
| 5,890,441 A | 4/1999 | Swinson et al. |
| 5,899,410 A | 5/1999 | Garrett |
| 5,965,836 A | 10/1999 | Rakov |
| 5,978,970 A | 11/1999 | Bright |
| D417,639 S | 12/1999 | Carichner et al. |
| 6,043,867 A | 3/2000 | Saban |
| 6,053,452 A | 4/2000 | Yamakawa et al. |
| 6,056,237 A | 5/2000 | Woodland |
| 6,122,572 A | 9/2000 | Yavnai |
| 6,126,109 A | 10/2000 | Barson et al. |
| 6,168,111 B1 | 1/2001 | Kayser et al. |
| 6,244,535 B1 | 6/2001 | Felix |
| 6,359,833 B1 | 3/2002 | English |
| 6,392,213 B1 | 5/2002 | Martorana et al. |
| 6,418,870 B1 | 7/2002 | Lanowy et al. |
| 6,422,507 B1 | 7/2002 | Lipeles |
| D461,159 S | 8/2002 | Miralles et al. |
| 6,467,733 B1 | 10/2002 | Young et al. |
| 6,535,816 B1 | 3/2003 | Smith |
| 6,567,044 B2 | 5/2003 | Carroll |
| 6,571,715 B1 | 6/2003 | Bennett et al. |
| 6,588,700 B2 | 7/2003 | Moore et al. |
| 6,601,795 B1 | 8/2003 | Chen |
| 6,626,401 B2 | 9/2003 | Fraser |
| 6,672,533 B1 | 1/2004 | Regebro |
| 6,678,394 B1 | 1/2004 | Nichani |
| 6,698,688 B1 | 3/2004 | Jones |
| 6,722,252 B1 | 4/2004 | O'Dwyer |
| 6,745,979 B1 | 6/2004 | Chen |
| 6,748,871 B2 | 6/2004 | Hellman |
| 6,847,865 B2 | 1/2005 | Carroll |
| 6,923,404 B1 | 8/2005 | Liu et al. |
| 6,931,775 B2 | 8/2005 | Burnett |
| 6,978,970 B2 | 12/2005 | Purcell |
| 7,014,141 B2 | 3/2006 | Cox et al. |
| 7,039,367 B1 | 5/2006 | Kucik |
| 7,083,140 B1 | 8/2006 | Dooley |
| 7,093,789 B2 | 8/2006 | Barocela et al. |
| 7,093,791 B2 | 8/2006 | Kusic |
| 7,185,846 B1 | 3/2007 | Bittle et al. |
| 7,207,254 B2 | 4/2007 | Veitch et al. |
| 7,210,654 B1 | 5/2007 | Cox et al. |
| 7,216,429 B2 | 5/2007 | Logan et al. |
| 7,237,750 B2 | 7/2007 | Chiu et al. |
| 7,275,973 B2 | 10/2007 | Ong |
| 7,299,130 B2 * | 11/2007 | Mulligan ............ G05D 1/0094 340/961 |
| 7,302,316 B2 | 11/2007 | Beard et al. |
| 7,338,010 B2 | 3/2008 | Corder et al. |
| 7,343,232 B2 * | 3/2008 | Duggan ............ G05D 1/0061 244/75.1 |
| 7,367,525 B2 | 5/2008 | McKendree et al. |

(56) References Cited

U.S. PATENT DOCUMENTS

| | | |
|---|---|---|
| 7,398,721 B1 | 7/2008 | Alberding et al. |
| 7,414,706 B2 | 8/2008 | Nichols et al. |
| 7,484,450 B2 | 2/2009 | Hunn et al. |
| 7,559,505 B2 | 7/2009 | Janka |
| 7,581,702 B2 | 9/2009 | Olson et al. |
| 7,584,925 B2 | 9/2009 | Miller et al. |
| 7,631,833 B1 | 12/2009 | Ghaleb et al. |
| 7,742,436 B2 | 6/2010 | Carrillo et al. |
| 7,793,606 B2 | 9/2010 | LaCour |
| 7,800,645 B2 | 9/2010 | Nonoyama et al. |
| 7,816,635 B2 | 10/2010 | Fink |
| 7,841,559 B1 | 11/2010 | O'Shea |
| 7,883,051 B2 | 2/2011 | Sammy |
| 7,900,869 B2 | 3/2011 | Keβler et al. |
| 7,934,456 B1 | 5/2011 | Heitmann et al. |
| 8,068,983 B2 | 11/2011 | Vian et al. |
| 8,089,033 B2 | 1/2012 | Zank et al. |
| 8,089,034 B2 | 1/2012 | Hammerquist |
| 8,109,212 B2 | 2/2012 | O'Dwyer |
| 8,178,825 B2 | 5/2012 | Goossen et al. |
| 8,231,079 B2 | 7/2012 | Oyama |
| 8,424,233 B2 | 4/2013 | Cronin et al. |
| 8,439,301 B1 | 5/2013 | Lussier et al. |
| 8,444,082 B1 | 5/2013 | Foch |
| 8,657,226 B1 | 2/2014 | McGinnis |
| 8,662,441 B2 | 3/2014 | Powell et al. |
| 8,686,326 B1 | 4/2014 | Dennison et al. |
| 8,692,171 B2 | 4/2014 | Miller et al. |
| 8,887,641 B1 | 11/2014 | Manole et al. |
| 8,924,069 B1 | 12/2014 | Kaneshige et al. |
| 8,985,504 B2 | 3/2015 | Tao et al. |
| 9,108,713 B2 | 8/2015 | Tao et al. |
| 9,127,908 B2* | 9/2015 | Miralles ............ F41G 7/2246 |
| 9,187,184 B2 | 11/2015 | Miralles et al. |
| 9,703,295 B1 | 7/2017 | Neal, III et al. |
| D813,761 S | 3/2018 | Balaresque et al. |
| 9,947,230 B2* | 4/2018 | Hu ................ G08G 5/0034 |
| 10,042,360 B2 | 8/2018 | Nicoloff et al. |
| 10,222,177 B2* | 3/2019 | Miralles ............ F41G 7/2246 |
| 10,494,093 B1* | 12/2019 | Miralles ............ F41G 9/002 |
| 10,583,910 B2 | 3/2020 | Tao et al. |
| 10,696,375 B2 | 6/2020 | Miralles et al. |
| 11,040,766 B2 | 6/2021 | Tao et al. |
| 2002/0030142 A1 | 3/2002 | James |
| 2002/0062730 A1 | 5/2002 | Thornton |
| 2003/0006340 A1 | 1/2003 | Harrison et al. |
| 2003/0089219 A1 | 5/2003 | Gorman |
| 2003/0094536 A1 | 5/2003 | LaBiche |
| 2003/0136873 A1 | 7/2003 | Churchman |
| 2003/0155463 A1 | 8/2003 | Cox et al. |
| 2003/0173459 A1 | 9/2003 | Fanucci et al. |
| 2003/0178527 A1 | 9/2003 | Eisentraut et al. |
| 2003/0192985 A1 | 10/2003 | Lipeles |
| 2004/0030449 A1* | 2/2004 | Solomon ............ H04B 7/18517 |
| | | 700/245 |
| 2004/0068351 A1 | 4/2004 | Solomon |
| 2004/0167682 A1 | 8/2004 | Beck et al. |
| 2004/0200375 A1 | 10/2004 | Kautzsch et al. |
| 2004/0217230 A1 | 11/2004 | Fanucci et al. |
| 2005/0004723 A1* | 1/2005 | Duggan ............ B64C 19/00 |
| | | 701/24 |
| 2005/0004759 A1 | 1/2005 | Siegel |
| 2005/0011397 A1 | 1/2005 | Eches |
| 2005/0051667 A1 | 3/2005 | Arlton et al. |
| 2005/0077424 A1 | 4/2005 | Schneider |
| 2005/0127242 A1 | 6/2005 | Rivers |
| 2005/0139363 A1 | 6/2005 | Thomas |
| 2005/0178898 A1 | 8/2005 | Yuen |
| 2005/0195096 A1 | 9/2005 | Ward et al. |
| 2005/0204910 A1 | 9/2005 | Padan |
| 2005/0218260 A1 | 10/2005 | Corder et al. |
| 2005/0255842 A1 | 11/2005 | Dumas et al. |
| 2005/0258306 A1 | 11/2005 | Barocela et al. |
| 2005/0274845 A1 | 12/2005 | Miller et al. |
| 2006/0011777 A1 | 1/2006 | Arlton et al. |
| 2006/0074557 A1* | 4/2006 | Mulligan ............ G05D 1/0094 |
| | | 701/13 |
| 2006/0132753 A1 | 6/2006 | Nichols et al. |
| 2006/0253254 A1 | 11/2006 | Herwitz |
| 2006/0255205 A1 | 11/2006 | Gleich et al. |
| 2007/0018033 A1 | 1/2007 | Fanucci et al. |
| 2007/0023582 A1 | 2/2007 | Steele et al. |
| 2007/0057115 A1 | 3/2007 | Newton |
| 2007/0125904 A1 | 6/2007 | Janka |
| 2007/0152098 A1 | 7/2007 | Sheahan et al. |
| 2007/0157843 A1 | 7/2007 | Roemerman et al. |
| 2007/0210953 A1 | 9/2007 | Abraham et al. |
| 2007/0215751 A1 | 9/2007 | Robbins et al. |
| 2007/0246601 A1 | 10/2007 | Layton |
| 2008/0041221 A1 | 2/2008 | Gaigler |
| 2008/0061188 A1 | 3/2008 | Morris et al. |
| 2008/0071431 A1 | 3/2008 | Dockter et al. |
| 2008/0074312 A1 | 3/2008 | Cross et al. |
| 2008/0078865 A1 | 4/2008 | Burne |
| 2008/0087763 A1 | 4/2008 | Sheahan et al. |
| 2008/0088719 A1 | 4/2008 | Jacob et al. |
| 2008/0093501 A1 | 4/2008 | Miller et al. |
| 2008/0111021 A1 | 5/2008 | Toth et al. |
| 2008/0133069 A1 | 6/2008 | Rica et al. |
| 2008/0177432 A1 | 7/2008 | Deker et al. |
| 2008/0206718 A1 | 8/2008 | Jaklitsch et al. |
| 2008/0215195 A1 | 9/2008 | Jourdan et al. |
| 2008/0217486 A1 | 9/2008 | Colten et al. |
| 2008/0243371 A1 | 10/2008 | Builta et al. |
| 2009/0008495 A1 | 1/2009 | Koenig |
| 2009/0045290 A1 | 2/2009 | Small et al. |
| 2009/0050750 A1 | 2/2009 | Goossen |
| 2009/0100995 A1 | 4/2009 | Fisher |
| 2009/0114762 A1 | 5/2009 | Hurty |
| 2009/0157233 A1 | 6/2009 | Kokkeby et al. |
| 2009/0242690 A1 | 10/2009 | Sammy |
| 2009/0302151 A1 | 12/2009 | Holmes |
| 2009/0321094 A1 | 12/2009 | Thomas |
| 2010/0012774 A1 | 1/2010 | Fanucci et al. |
| 2010/0025543 A1 | 2/2010 | Kinsey et al. |
| 2010/0042269 A1 | 2/2010 | Kokkeby et al. |
| 2010/0042273 A1 | 2/2010 | Meunier et al. |
| 2010/0121575 A1 | 5/2010 | Aldridge et al. |
| 2010/0141503 A1 | 6/2010 | Baumatz |
| 2010/0198514 A1* | 8/2010 | Miralles ............ F41G 9/002 |
| | | 701/302 |
| 2010/0212479 A1 | 8/2010 | Heitmann |
| 2010/0213309 A1 | 8/2010 | Parks |
| 2010/0264260 A1 | 10/2010 | Hammerquist |
| 2010/0281745 A1 | 11/2010 | Condon et al. |
| 2010/0282917 A1 | 11/2010 | O'Shea |
| 2010/0314487 A1 | 12/2010 | Boelitz et al. |
| 2011/0035149 A1 | 2/2011 | McAndrew et al. |
| 2011/0084162 A1 | 4/2011 | Goossen et al. |
| 2011/0146525 A1 | 6/2011 | Caillat |
| 2011/0226174 A1 | 9/2011 | Parks |
| 2011/0315817 A1 | 12/2011 | Miralles et al. |
| 2012/0000390 A1 | 1/2012 | Heitmann |
| 2012/0068002 A1 | 3/2012 | Unger et al. |
| 2012/0205488 A1 | 8/2012 | Powell et al. |
| 2012/0267473 A1 | 10/2012 | Tao et al. |
| 2014/0172200 A1 | 6/2014 | Miralles |
| 2015/0008280 A1 | 1/2015 | Smoker |
| 2015/0053193 A1 | 2/2015 | Pruett et al. |
| 2016/0121992 A1 | 5/2016 | Saroka et al. |
| 2016/0214705 A1 | 7/2016 | Walker et al. |
| 2017/0144749 A1 | 5/2017 | Tao et al. |
| 2017/0369150 A1 | 12/2017 | Finklea et al. |
| 2020/0198761 A1 | 6/2020 | Tao et al. |

FOREIGN PATENT DOCUMENTS

| | | |
|---|---|---|
| CN | 2769834 Y | 4/2006 |
| CN | 101198520 A | 6/2008 |
| CN | 101495367 A | 7/2009 |
| GB | 2434783 A | 8/2007 |
| JP | 60188799 | 9/1985 |
| JP | S60188799 A | 9/1985 |
| JP | 64028096 | 1/1989 |

(56) References Cited

FOREIGN PATENT DOCUMENTS

| | | |
|---|---|---|
| JP | 1993106997 | 4/1993 |
| JP | 06273098 | 9/1994 |
| JP | H0789492 A | 4/1995 |
| JP | 09026300 | 1/1997 |
| JP | 2000266499 A | 9/2000 |
| JP | 2001153599 A | 6/2001 |
| JP | 2001206298 A | 7/2001 |
| JP | 2003177000 A | 6/2003 |
| JP | 2005067398 A | 3/2005 |
| JP | 2008536736 A | 9/2008 |
| WO | 2005023642 A2 | 3/2005 |
| WO | 2006097592 A1 | 9/2006 |
| WO | 2008020448 A2 | 2/2008 |
| WO | 2008020889 A2 | 2/2008 |
| WO | 2009079045 A2 | 6/2009 |

OTHER PUBLICATIONS

Andreas Parsch; Coyote; Advanced Ceramics Research; 2006; . (Year: 2006).

BusinessWire; First Test Flight of Coyote Unmanned Aircraft System; Jan. 19, 2010; YouTube; ,https://www.youtube.com/watch?v=0MmdHLRxIN4>. (Year: 2010).

International Search Report for serial No. PCT/US10/22942 dated Sep. 27, 2010.

TARES Unmanned Combat Air Vehicle (UCAV), Germany, [retrieved on Feb. 24, 2010], Retrieved from the Internet:<URL:http://www.army-technology.com/projects/taifun/>.

Wikipedia, "Sabot", https://en.wikipedia.org/wiki/Sabot; archived on Feb. 24, 2011 by Internet Archive, https://web.archive.org/web/20100224075656/https://en.wikipedia.org/wiki/Sabot; accessed Oct. 10, 2018 (Year:2011).

\* cited by examiner

MULTIMODE UNMANNED AERIAL VEHICLE

CROSS-REFERENCE TO RELATED APPLICATION

This application claims priority to and the benefit of U.S. patent application Ser. No. 16/119,872, filed Aug. 31, 2018, U.S. patent application Ser. No. 14/832,688, filed Aug. 21, 2015, U.S. patent application Ser. No. 12/698,995, filed Feb. 2, 2010, U.S. Provisional Patent Application Ser. No. 61/149,304, filed Feb. 2, 2009, U.S. Provisional Patent Application Ser. No. 61/241,017, filed Sep. 9, 2009, U.S. Provisional Patent Application Ser. No. 61/240,985 filed Sep. 9, 2009, U.S. Provisional Patent Application Ser. No. 61/240,987 filed Sep. 9, 2009, U.S. Provisional Patent Application Ser. No. 61/240,996 filed Sep. 9, 2009, U.S. Provisional Patent Application Ser. No. 61/241,001 filed Sep. 9, 2009, all of which are hereby incorporated herein by reference in their entirety for all purposes.

TECHNICAL FIELD

The invention, in its several embodiments, pertains to unmanned aerial vehicles (UAVs) and particularly to small and/or man-portable UAVs.

BACKGROUND

The effectiveness of munitions, such as guided bombs, and strike missiles having forward-directed explosives, and/or configured to impart kinetic energy of the vehicle to a target, may be characterized as a shrinking conic effectiveness volume that defines the limits to its ability to maneuvering, and desirably contains the target during closed-loop terminal homing about the target. Such munitions and missiles satisfy the traditional battlefield where the target could be more readily defined, at least to some degrees, relative to non-targets, such as elements of the civilians population. Reconnaissance aircraft, including reconnaissance UAVs, typically coordinate via communication channels to facilitate a strike mission, such as an artillery strike, on an identified target. A UAV carrying missiles or munitions, may have the ability for a quicker response via launching or releasing a missile or munitions from the UAV. However, the release of a missile or munitions from a UAV will also suffer from the aforementioned shrinking effectiveness cone. Non-traditional engagements exacerbate the need for minimal collateral damage, however, with the use of missiles, or munitions with defined effectiveness (i.e., maneuverability) cones, makes it increasingly impossible, due to shrinking maneuver time and limited maneuverability of the homing vehicle, to change the target or move off-target as the missile or guided bomb closes on the target. FIG. 1A is a planar depiction of the maneuver cone of a maneuverable guided device that may be launched from a carrier such as by an aircraft 5. The depicted guided device has a ground speed to the right in the illustration and experiences the effects of both drag and gravity. The nominal expected trajectory of the guided device 10 may bring it close to a nominal target 20 disposed on the ground 30. Depending on the adjustments of its aerodynamic effectors and/or shift in either its center of pressure or center of mass, the guided device 10 may cause its actual trajectory to fall within volume of the maneuver cone, depicted in the planar illustration of FIG. 1A as a maneuver region 40. With maximal turning downward, the guided device will follow the trajectory illustrated as the most uprange of trajectories from the nominal target, i.e., the uprange maneuver-limited boundary 42 of the maneuver cone 40. With maximal turning upward—exploiting optima glide slope characteristics of the guided device, the guided device will follow illustrated as the most downrange of trajectories from the nominal target, i.e., the downrange maneuver-limited boundary 41 of the maneuver cone 40. The downrange footprint 45 of the base of the maneuver cone 40 may be defined as the distance along the ground 30 from the uprange maneuver-limited boundary 42 intersection 43 with ground 30 to the downrange maneuver-limited boundary 41 intersection 44 with the ground 30. FIG. 1B is a planar depiction of a maneuver cone 50 of the guided device 10 of FIG. 1A, but later in the time of flight. The downrange footprint 55 of the base of the maneuver cone 50 may be defined as the distance along the ground 30 from the uprange maneuver-limited boundary 52 intersection 53 with ground 30 to the downrange maneuver-limited boundary 51 intersection 54 with the ground 30. One may note that the downrange footprint 55 of FIG. 1B is smaller than the downrange footprint 45 of FIG. 1A. That is, in comparing FIG. 1A with FIG. 1B, the region of ground available to the guided device for target intercept shrinks as the maneuvering strike vehicle nears the nominal target.

SUMMARY

The present invention includes unmanned aerial vehicle (UAV) embodiments and other apparatus embodiments where the UAV may include a processing unit configured to transition the UAV from a first mode to a second mode, wherein the first mode is a terminal homing mode. The terminal homing mode of the processing unit of the UAV may further comprise homing on the target volume. In some embodiments, the processing unit is further configured to transition the UAV, responsive to an uplink signal, from the terminal homing mode to the second mode. In some embodiments the processing unit is further configured to transition the UAV, from the terminal homing mode to the second mode, responsive to an indicator generated by at least one of: onboard processing of the processing unit; an operator; and an indicator transmitting device. In some embodiments, the payload is integral to the UAV. In some embodiments, the payload is configured to be ejected from the UAV proximate to the target volume. In some embodiments, the processing unit comprises at least one of: a central processor configured to execute computer-executable instructions; electrical circuitry; electronic circuitry; and a logical gate array. In some embodiments, the second mode is a target search mode. UAV embodiments may further include a target sensor. UAV embodiments may further include a target sensor suite wherein the target sensor suite of the UAV comprises at least one of: an electro-optical camera, a long-wave infrared camera, a short-wave infrared camera, a radio frequency receiver, and a radio frequency transceiver. In some embodiments, the UAV may be characterized by a value of weight, and wherein the UAV is further configured to sustain a magnitude of lift, when in the second mode, of at least the value of the UAV weight. In some embodiments, the UAV may be further configured to sustain at least level flight when in the second mode.

Embodiments of the UAV are powered in flight, via a chemical battery store, storing energy in a range of ten to 1,000 watt-hours, and wherein the UAV is capable of transitioning from a terminal homing mode trajectory to a target search mode trajectory and then to a terminal homing mode trajectory. Some embodiments of the UAV are powered in flight, via a chemical battery store, storing less than 44 watt-hours of energy, and wherein the UAV is capable of transitioning from a terminal homing mode trajectory to a target search mode trajectory and then to a terminal homing mode trajectory. Embodiments of the UAV may be characterized by a value of mass of less than 23 kilograms. Embodiments of the UAV are characterized by a value of mass of at least 0.5 kilograms and are powered in flight, via a chemical battery store and an electrical motor-driven propeller, and where the UAV is capable of transitioning from a terminal homing mode trajectory to a reconnaissance mode trajectory and then to a terminal homing mode trajectory. Embodiments of the UAV may be characterized by a value of mass of at least 1.3 kilograms and are powered in flight, via a chemical battery store and an electrical motor-driven propeller, and wherein the UAV is capable of transitioning from a terminal homing mode trajectory to a reconnaissance mode trajectory and then to a terminal homing mode trajectory. Embodiments of the UAV may be configured to transition from a terminal homing mode trajectory to a target search mode trajectory and then to a terminal homing mode trajectory, where the UAV may be characterized by a value of launch mass of less than 23 kilograms, and where the UAV may be configured to generate thrust in flight via a propeller powered by least one: (a) a chemical battery store; and/or (b) a combustion engine. Embodiments of the UAV may be configured to transition from a terminal homing mode trajectory to a target search mode trajectory and then to a terminal homing mode trajectory, wherein the UAV is characterized by a value of mass of less than 23 kilograms, and wherein the UAV may be configured to generate thrust in flight via a turbine engine. Embodiments of the UAV may be configured for powered flight to maneuver to a target search mode trajectory, if the processing unit determines an uplink signal indicates a mode transition from a terminal homing mode comprising homing toward a target volume, to the target search mode, and if the indicative uplink signal is received at the UAV at least two seconds before the UAV achieves its closest approach to the target volume.

Embodiments of the present invention may include an apparatus comprising an unmanned aerial vehicle (UAV) airframe configured to deliver a payload into a target volume; and a processing unit onboard the UAV airframe, wherein the processing unit comprises at least one of: a central processing unit configured to execute computer-executable instructions; electrical circuitry; electronic circuitry; and a logical gate array; and wherein the processing unit is configured to transition the apparatus from a first mode to a second mode, wherein the first mode is a terminal homing mode wherein the terminal homing mode comprises the UAV homing on the target volume; and wherein the processing unit is further configured to transition the apparatus from the terminal homing mode to the second mode, responsive to an indicator generated by at least one of: onboard processing of the processing unit; an operator; and an indicator transmitting device. The second mode of some embodiments of the apparatus second mode is a target search mode, and wherein the apparatus further comprises a target sensor configured to receive electromagnetic emissions from a target search volume during at least the target search mode. Embodiments of the apparatus may be further configured to sustain at least level flight when in the target search mode.

The present invention includes methods and systems enabling an unmanned aerial vehicle (UAV) to transition from a terminal homing mode to a separate mode which may be any of a reconnaissance mode, a surveillance, a loiter mode, a observation mode, a stand-off mode, and/or a target search mode, responsive to a signal or value that the processing onboard the UAV recognizes as a mode transition initiation indicator that may be provided to the UAV uplink as a signal from an indicator transmitting device onboard the third party vehicle or at a third party transmission station, and/or as a signal from an operator, e.g., a hand-held user interface, and/or generated as an autonomous determination of scene change. An exemplary system may include a UAV comprising at least one sensor which may be a reconnaissance, observation and/or targeting sensor and a processing unit, wherein the processing unit is configured to transition the UAV from a terminal homing mode to a separate mode, such as a target search mode, responsive to an uplink signal. The at least one sensor, such as a targeting sensor, of the UAV may comprise an imaging device and the processing unit may be configured to transition the UAV from a terminal homing mode to a separate mode, such as a target search mode based on one or more image change conditions. In addition, the UAV may be powered to transition from a terminal homing mode trajectory to a separate mode trajectory, such as a target search mode trajectory and then to a terminal homing mode trajectory.

Some embodiments of the UAV may be powered in flight via a chemical battery store, storing less than 100 watt-hours of energy, and powering a UAV propeller motor to transition the UAV from a terminal homing mode trajectory to a separate mode trajectory, such as a target search mode trajectory and then to a terminal homing mode trajectory. Some embodiments of the UAV may have a mass of 1.0 to 1.4 kilograms, and may be powered in flight, via a chemical battery store, and an electrical motor-driven propeller to transition the UAV from a terminal homing mode trajectory to a separate mode trajectory, such as a target search mode trajectory and then to a terminal homing mode trajectory. Some embodiments of the UAV are less than 1.4 kilograms mass having at least one propeller that is electrically powered. Some embodiments of the UAV having masses approximately four to 25 kilograms, may have at least one propeller that is powered by an electric motor, or a combustion engine, and/or electrical-combustion hybrid engine. Some embodiments of the UAV may have a mass of approximately 25 kilograms or less, and may be powered by a combustion or turbine engine.

Some embodiments of the UAV are configured, during a transition from a terminal homing mode trajectory to a separate mode trajectory, such as a target search mode trajectory, to generate a magnitude of lift (aerodynamic lifting force), greater than the product of the local acceleration of gravity and the vehicle mass, or greater than the weight of the vehicle. Some embodiments of the UAV may be configured to power a thrust-generating propeller during a transition from a terminal homing mode trajectory to and during a separate mode, such as a target search mode trajectory. A UAV's in-flight acceleration in a direction substantially orthogonal to its centerline may be termed "lateral acceleration," and its acceleration or deceleration along its centerline may be termed "longitudinal acceleration." Accordingly, embodiments of the UAV are configured to laterally accelerate more than is required for level flight, i.e., to overcome gravity, and do so for a duration covering multiple mode transitions. That is, the UAV requires a first magnitude of acceleration due to lift greater than a local acceleration of gravity in order to hold level flight, and in the present invention the UAV is capable of generating a magnitude of acceleration due to lift greater than the local acceleration of gravity to transition from a terminal homing mode trajectory to a separate mode, such as a target search mode, trajectory and then to a terminal homing mode trajectory. As part of the transition, the vehicle may initiate propeller or increase propeller rotation rate. Embodiments of the UAV may be powered in flight to achieve such a separate mode, such as a target search mode trajectory—if the processing unit determines an uplink signal indicates a mode transition from a terminal homing mode towards a separate mode, such as a target search mode, and if the uplink signal is received at the UAV in time for the UAV to maneuver away from the target, such as, in some embodiments, at least two seconds before the UAV's closest approach to the target. Such maneuvering away can be to prevent a collision with the target or maneuvering to maintain the UAV a minimum distance from the target.

Being configured to transition between modes of flight, embodiments of the UAV are capable of converting stored chemical energy, e.g., battery and/or combustible fuel, into vehicle potential energy, e.g., an increased flight altitude, and/or kinetic energy, e.g., air speed, during the transition from target homing mode to a separate mode, such as a target search or reconnaissance mode, and optionally back to a target homing mode.

Machine-enabled process embodiments of the present invention include a method of transitioning flight modes of an unmanned aerial vehicle (UAV) comprising: (a) testing, by a UAV processor, for a mode change while in an automatic terminal homing mode; (b) receiving a mode change command signal from an external source and/or an autonomously generated signal based on scene changes; and (c) transitioning to a separate mode, such as a target search mode and altering flight commands based on the mode change command signal. Accordingly, for some embodiments, the at least one sensor, such as a targeting sensor, of the UAV may comprise an imaging device and wherein the processing unit is configured to transition the UAV from a terminal homing mode to a separate mode, such as a target search mode based on one or more image change conditions, e.g., a change in quantity and/or magnitude of pixel states above a threshold or a change in the information content of an image or portion of an image—such as time-differenced discrete time Fourier transforms of images. An exemplary method of transitioning flight modes of an unmanned aerial vehicle (UAV) may comprise: (a) testing, by a UAV processor, for a mode change while in an automatic terminal homing mode; (b) receiving a mode change command signal; and (c) transitioning to a pre-terminal homing mode, such as a separate mode of target detection and/or target acquisition; and (d) altering flight commands based on the mode change command signal. For some embodiments, the step of receiving a mode change command signal may be based on one or more image change conditions. For some embodiments, the step of receiving a mode change command signal may be based on an external source, e.g., a ground operator station or an airborne transmitter. For some embodiments, the pre-terminal homing mode may be a target search mode, and the target search mode may further comprise a pre-terminal commit volume. Embodiments of the UAV may downlink images and flight status data, but the flight data from the determined tracking angles of the image sensor, the angle rate gyroscopes, the linear accelerometers, and the GPS receiver may all be taken into an onboard processing unit to effect flight control changes—via control surface actuators and/or propeller spin rate.

Terminal homing typically includes a descent that is steep enough that the propulsion system may reduce its power output, or may not be required at all, for the UAV to maintain adequate, or a minimum, closing flight speed. Such a minimum flight speed may be the stall and/or a minimum maneuver speed of the UAV. Such a reduction of power results in a reduced acoustic signature.

The various UAV embodiments of the invention may be launched via several systems, e.g., (a) tube launched from ground; (b) launched or dropped from some other aerial platform; (c) launched from a stationary or moving ground or marine vehicle.

BRIEF DESCRIPTION OF THE DRAWINGS

Embodiments of the present invention are illustrated by way of example and not limitation in the figures of the accompanying drawings, and in which.

DETAILED DESCRIPTION

Figure 1A:
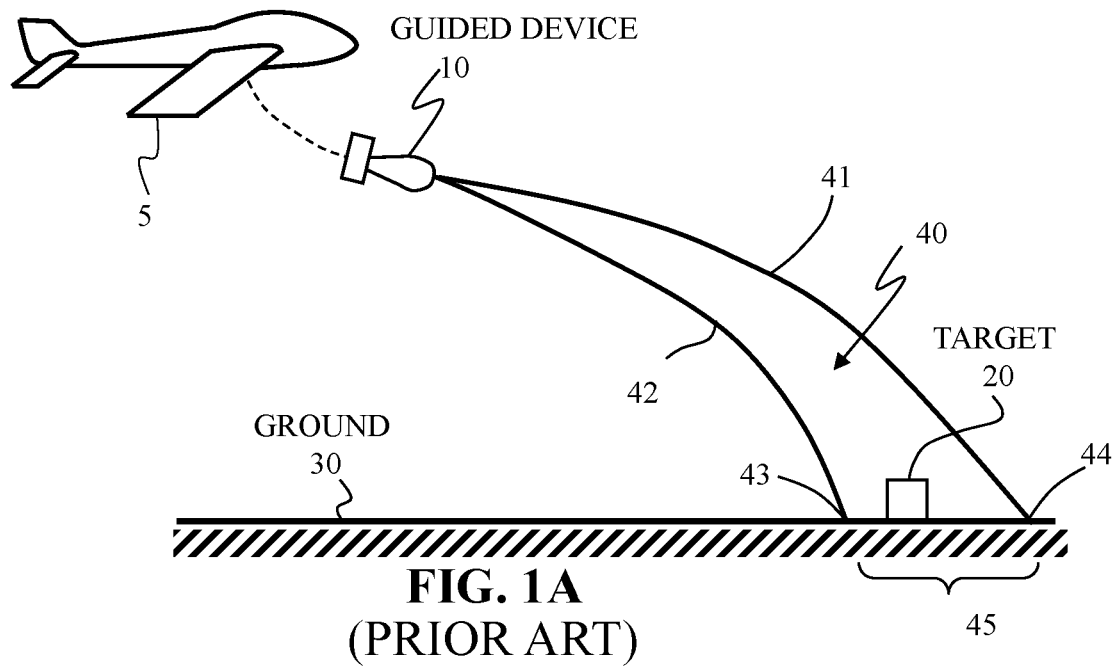
FIG. 1A is a depiction of maneuver limits of a maneuverable strike vehicle.
Figure 1B:
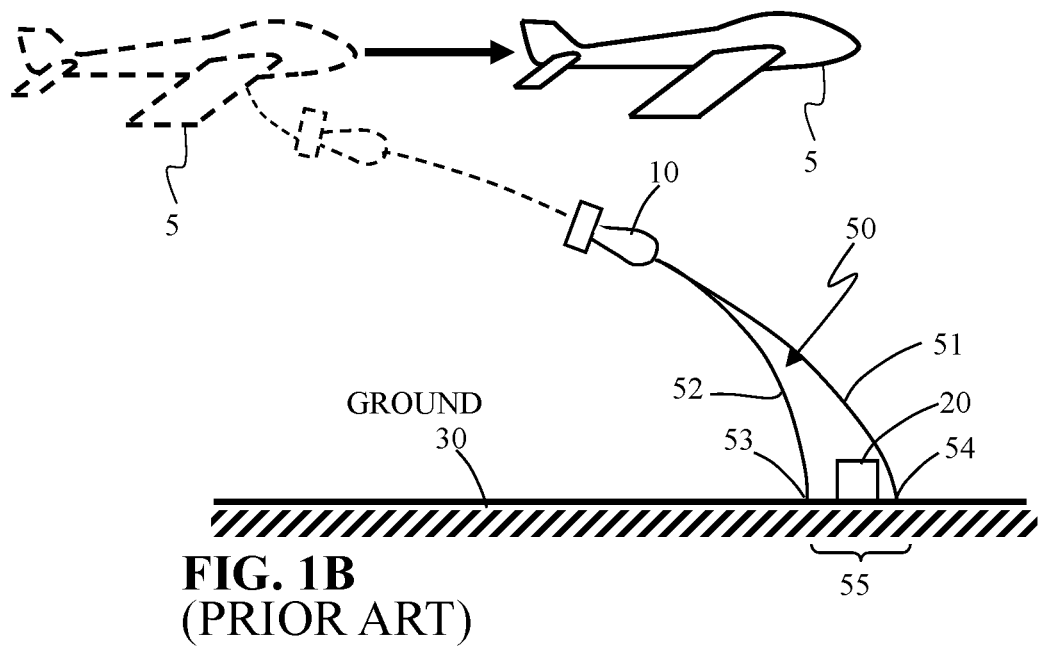
FIG. 1B is a planar depiction of the shrinking maneuver cone of a maneuverable strike vehicle.
Figure 2A:
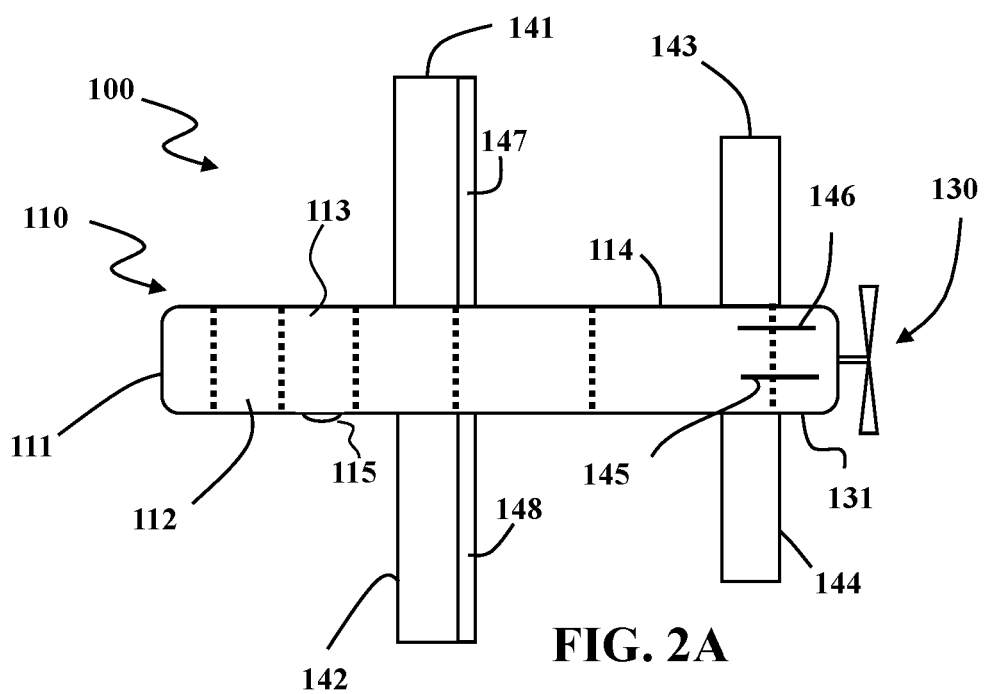
FIG. 2A is a plan view of an air vehicle embodiment of the present invention.

Reference is made to the drawings that illustrate exemplary embodiments of the present invention. FIG. 2A illustrates a top view of an exemplary embodiment of the UAV portion 100 of the present invention. The exemplary UAV comprises a front end 110 having a homing sensor 111, e.g., a pixel array for sensing visible and/or infrared light, and deployable payload 112, e.g., a warhead or other payload for precision delivery that may be lethal or non-lethal in nature, i.e. a deployable electronic subassembly, a pigmenting capsule. The front end may be configured to support various warheads such as those that may be high explosive (HE), armor-piercing, a shaped-charge, anti-personnel, anti-radiation, electro-magnetic pulse (EMP) and/or a directed blast. These warheads may be removable and/or interchangeable. The front end may be configured to support an additional battery pack in lieu of or in partial place of a warhead unit, which may extend the range of the UAV. Embodiments of the UAV may have a sensor suite, including sensors 111 and 115, that comprises one or more of the following passive and/or active receivers such as: radar imaging sensor, such as a millimeter wave system, a laser receiver and/or transmitter, a laser imagining system such as a light detection and ranging (LiDAR) device, and other electromagnetic detectors such as radio wave receivers. Commercial sources for these exemplary front end sensors include the Micron MT9P031, 5 Mp CMOS Digital Image Sensor by Micron Technology, Inc. of Boise, Id. 83707-0006. The front end 110 may also include an electronics assembly (EA) 113, or avionics, that may include a guidance processor comprising guidance instructions that, when executed, take in information pertaining to the UAV position, linear and/or rotational velocities, linear accelerations and/or attitude, and generate commands for either or both autopilot processing and/or engine control processing or remote human pilot processing. The front end 110 or EA 113 may also include a side viewing sensor or camera 115 (shown in FIGS. 2A and 2B) positioned to allow viewing of an object or target while the UAV is turning about the object or target. For example, by banking the UAV such that the side viewing sensor 115 is aimed towards the ground, the sensor 115 could observe a target while the UAV rotates about it. The sensor 115 could be any of the example sensors set forth herein for the sensor 111.

The UAV may comprise one or more power sources 114, such as battery units, combustion engines including internal combustions engines, turbines, or fuel cells, and power conditioning circuits. Additional, propulsive power sources may augment or replace a propeller system such as, a turbine engine, or a solid or liquid rocket motor. Embodiments of the UAV may include a chemical battery store, e.g., storing approximately 44 watt-hours of energy that may be used to power onboard electrical devices including a propeller motor for a flight of ten to 30 minutes for a UAV in the range of one to 1.5 kilograms mass. Embodiments of the UAV may be smaller and/or have shorter flight durations and/or have less mass, and/or a different lift-to drag ratio, and accordingly may require less than 44-watt hours. Embodiments of the UAV may be larger and/or have longer flight durations, and accordingly may require more than 44-watt hours. As the vehicle mass may grow over approximately 1.3 kilograms, thrust and lift requirements for an efficient terminal homing cone may drive the vehicle to include a combustion engine augmenting a battery-electrical system having greater than 44-watt hours, such a hybrid system, or replacing the battery-electric system with an internal combustion engine and/or a turbine engine. The UAV may include vehicle-specific sensors, e.g., a GPS antenna and GPS receiver, e.g., as part of the EA and/or attitude and/or rate gyroscopes and/or linear accelerometers that may be proximate to the EA and/or vehicle center of gravity. The UAV may include a mode of thrust generation, such as a propeller 130 and a propeller motor 131, and other embodiments may use, separately or in combination, turbine motors and/or rocket motors.

The UAV may have lifting surfaces such as starboard wing 141, a port wing 142, a port tail 144, a starboard tail 143 and rudders 145,146. The wing elements 141, 142 may have actuated control surfaces 147, 148, operating as elevons, or may be embodied as wings with surfaces operated as elevators. Embodiments of the UAV may have a minimum for level flight with a maneuver margin of about 1.2 to 2.0 times the acceleration of gravity, sustainable for a major portion of the duration of a sortie. In terminal homing mode and at the last possible point of abort, embodiments of the UAV have a maneuver margin of about 2.0 to 2.5 times the acceleration of gravity. Higher accelerations characterizing maneuverability may be desired, but one recognizes these higher levels are achievable with a bigger wing, and/or higher lift, airfoils that both require additional weight and volume. Embodiments of the UAV have a wing area of 0.049 square meters (about 76 square inches) and can be in the range of 0.016 square meters (about 15 square inches) to 1.0 square meters (about 1550 square inches).

Reference is made to U.S. provisional patent application No. 61/240,985, filed Sep. 9, 2009, titled "Elevon Control System," which is incorporated herein by reference. The tail elements 143, 144 may have actuated control surfaces, operated as ailerons or elevators. The rudders 145, 146 of the UAV may be body-fixed, i.e., the rudders 145, 146 function as vertical stabilizers, and accordingly, the UAV may be statically stable in yaw, i.e., the yaw center of pressure aft of the vehicle center of gravity. The UAV yaw stability may be augmented by articulated, controlled trailing sections or surfaces of the one or more rudder surfaces. Some embodiments of the UAV may have a two-rudder assembly mounted on a rotatable platform conformal to the UAV fuselage to effect an augmentation in yaw control. In some embodiments, the UAV is packaged in a UAV launcher-container and is man-portable. Reference is made to U.S. provisional patent application No. 61/240,987, filed Sep. 9, 2009, titled "Unmanned Aerial Vehicle Portable Launch Tube," which is incorporated herein by reference. The UAV may have a mass of 0.5 to 25 kilograms. Accordingly, some embodiments of the UAV may be configured to transition from a terminal homing mode trajectory to a target search mode trajectory and then to a terminal homing mode trajectory, where the UAV has a launch weight mass of less than 25 kilograms mass, and is powered in flight via a propeller driven by a chemical battery store, a combustion engine, or both. In some embodiments, the UAV may be powered by a turbine engine. Embodiments of the UAV may be configured to transition from a terminal homing mode trajectory to a target search mode trajectory and then to a terminal homing mode trajectory while having airspeeds in the range of 50 to 120 knots, and a flight duration of about 20 minutes, where the UAV has a launch weight mass of 1.0 to 2.0 kilograms mass, and is powered in flight via a propeller driven by a chemical battery store, a combustion engine, or both.

Figure 2B:
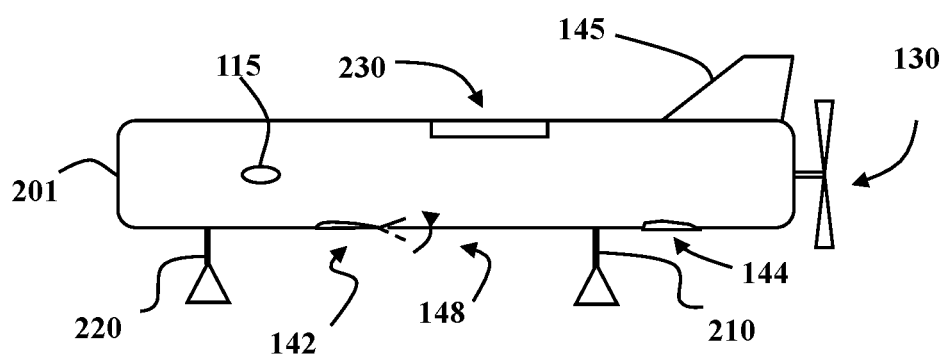
FIG. 2B is a side elevational view of the air vehicle embodiment of the present invention.

FIG. 2B shows in side view the exemplary UAV where the port wing 142 is shown with the trailing control surface 148 in motion and with two antenna wires 210, 220 (not to scale) extending from the fuselage 201. One antenna element may be used as an uplink 210, particularly for receiving a mode control signal that effects a transition from a terminal homing mode to a target search mode, or loiter mode, or a transition from target search mode to a homing mode, e.g., a terminal homing mode. Another antennal element may be used as a downlink 220 for transmitting data such as live video, automatic video tracking status, flight parameters, and/or UAV states. A single antenna may be used for both functions when equipped with transceiver capability. While video data and flight status data may be downlinked, the UAV processes output from various onboard flight sensors, e.g., gyros, accelerometers, GPS receiver outputs, and target data from the image sensor, or other front end target seeker/tracker sensor, via an onboard processor to generate control surface actuation commands and accordingly guide the UAV for both target search and terminal homing phases and the transition therebetween. A GPS antenna 230 may be mounted conformably or within the fuselage, i.e., behind the skin of the fuselage when made of material largely transparent (low loss) in the GPS frequency bands. Generally, the GPS antenna may be mounted or otherwise disposed on or along the UAV fuselage so as to be capable of receiving signals from a GPS satellite constellation.

Figure 3:
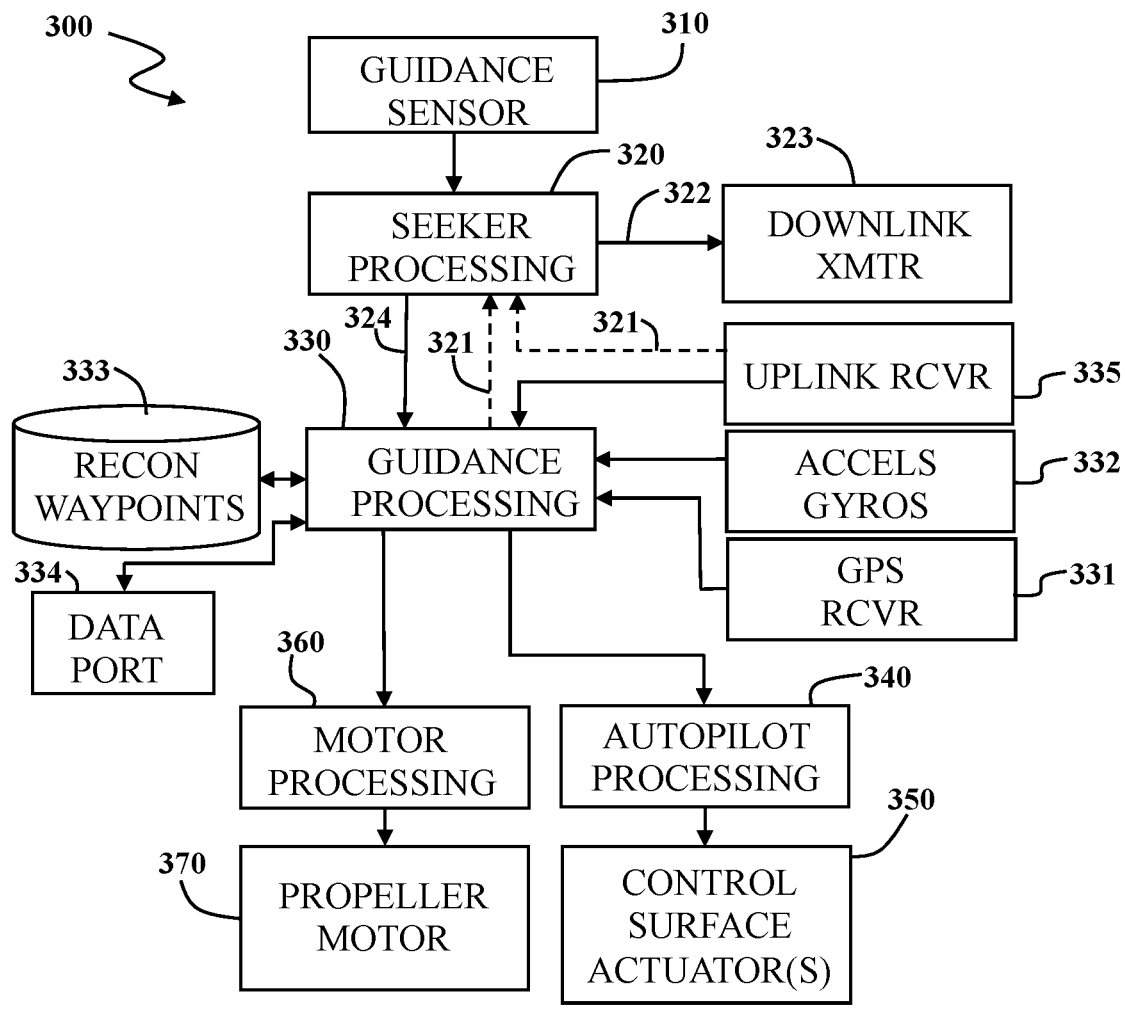
FIG. 3 is a top level functional block diagram of a system architecture embodiment of the present invention.

FIG. 3 shows an exemplary functional block diagram of the UAV processing and guidance and control subsystem 300 where the guidance sensor 310 provides information about the external environment pertaining to seeking or tracking processing of a seeker or tracker processor 320. A guidance sensor, and more generally, a guidance sensor suite, may include a passive and/or active radar subsystem, an infrared detection subsystem, an infrared imaging subsystem, a visible light imaging subsystem such as a video camera-based subsystem, an ultraviolet light detection subsystem, and combinations thereof. The seeker processor 320 may include both image processing and target tracking processing, and target designation or re-designation input 321 that may be received from an uplink receiver 335 and/or as an output of a guidance processor 330. The image processing and/or target tracking information 322 may be transmitted via a downlink transmitter 323, which may be a part of an uplink/downlink transceiver. The guidance processor 330, in executing instructions for guidance processing, may take in the target information 324 from the seeker processing 320, and UAV flight status information such as position, velocity, and/or attitude from the GPS receiver 331, and/or gyroscopes and accelerometers 332, if any. The guidance processor 330, to receive navigation waypoints and/or target search optimizing trajectories, may reference a memory store 333. For system embodiments, the guidance process 330 may receive and/or upload navigation waypoints and/or target search optimizing trajectories, by way of an external data port 334, e.g., during a pre-launch phase, or by way of an uplink receiver 335, e.g., during a post-launch phase. The guidance processor 330, as part of executing instructions for determining flight path, a trajectory, or a course steering angle and direction, may reference the waypoint and/or surveillance optimizing trajectory information, particularly when not in a terminal homing mode. Reference is made to U.S. provisional patent application No. 61/241,001, filed Sep. 9, 2009, titled "Unmanned Aerial Vehicle System with Remotely Operated UAV in an RF Transparent Launch Tube," which is incorporated herein by reference. The guidance processor 330 may receive a command via an uplink receiver 335 to switch or otherwise transition from a terminal homing mode to a target search mode, i.e., non-terminal homing mode, and switch from a target search mode to a terminal homing mode. The UAV may autonomously, or responsive to an uplink, process images from a side-mounted camera, i.e. sensor 115, or other scene-sensing sensor, and switch to a front-mounted camera or other scene-sensing sensor. For example, a visual target lock by the seeker processing 320 may be tracked with reference to GPS coordinates and integrated into a terminal homing solution that may be iteratively determined by the guidance processor 330 executing instructions pertaining to determining a revisable terminal solution. The guidance processing 330 may include a strap-down navigation solution aided by the GPS receiver, and may accordingly support the storage of pre-terminal commit points or return waypoints following a break from terminal homing that may be initiated by an external uplink or initiated autonomously based on scene changes during the terminal homing phase. Thereafter, the UAV may return to a volume of space within, proximate to, or substantially the same volume of space from which it initiated the preceding terminal phase. Embodiments of the avionic sensors may include exemplary devices such as a digital camera having five megapixel resolution, an image rate of 60 Hz, digital zoom, e.g., 1X-3X, regional subframing, and automatic brightness control, and/or a long wavelength infrared camera having a 640×480 FPA format, a STMicroelectronics of Geneva, Switzerland ARM™ 9 microcontroller, a STMicroelectronics LIS3L02DQ MEMS 3-axis linear accelerometer, Analog Devices, Inc. of Norwood, Mass. ADXRS612 gyroscopes, a Silicon Microstructures, Inc. of Milpitas, Calif. SM5872 air speed sensor, a VTI Technologies, Inc. of China SCP1000-D01/D11 Pressure Sensor as Barometer and Altimeter, a Honeywell, Inc. of Plymouth, Minn. HMC 1043 magnetometer, and a uBlox of Thalwil, Switzerland NEO-5Q GPS (L1, C/A code) receiver and a patch L1 GPS antenna. Other GPS receivers and antennas may be used depending on mission and expected environmental conditions.

Embodiments of the flight air speed of the UAV may be in the range of 57 to 130 miles per hour (50-112 knots), however other air speeds are possible. An example of a terminal homing mode may utilize a combination of pursuit and proportional navigation guidance with a gravity bias that may be applied for strike sub-modes of the terminal homing mode, and an acceleration bias that may be applied for aerial intercept sub-modes of the terminal homing mode. The guidance processing 330 and autopilot processing 340 may execute instructions to effect a bank-to-turn guidance, for example in an elevon embodiment, to redirect the air vehicle by reorienting its velocity vector principally via roll angle and lift, and additional via propeller throttling. For example, one or more control surfaces may be reoriented via one or more control surface actuators 350 causing forces and torques to reorient the air vehicle and the portion of its linear acceleration that is orthogonal to its velocity vector. The portion of the linear acceleration of the air vehicle that is along the velocity vector is greatly affected by aerodynamic drag, and the linear acceleration may be increased via a motor processor 360 and a propeller motor 370. For embodiments with full three-axis control, additional control topologies may be implemented including skid-to-turn and other proportion-integral-differential guidance and control architectures as well. The seeker processing, guidance processing, motor processing, and/or autopilot processing may be executed by a single microprocessor having addressable memory and/or the processing may be distributed to two or more microprocessors in distributed communication, e.g., via a data bus.

Figure 4:
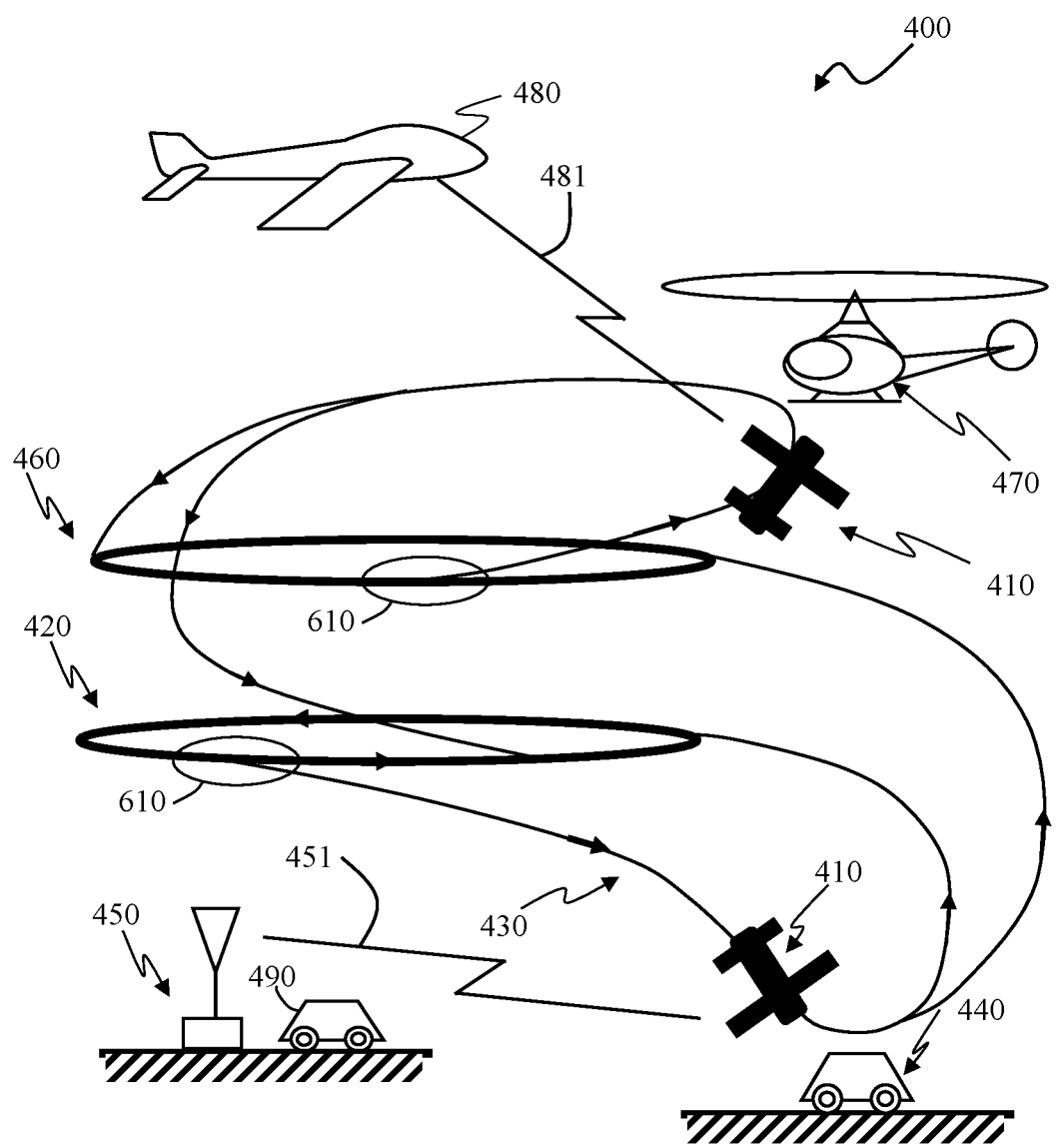
FIG. 4 is an exemplary depiction of operational deployments of an embodiment of the present invention.

FIG. 4 is a simplified illustration 400 of a mode transition of the present invention. The UAV 410 may be in a racetrack, circular (i.e. rotation about a ground point or potential target) or other pattern of flight 420 as part of a target search mode, loiter mode, surveillance mode, reconnaissance mode and/or other observation mode. The seeker processing together with the guidance processing and/or an uplink from a command node, e.g. a ground command node 450, may place the UAV 410 into a terminal homing strike mode 430. The UAV 410 then may home on the ground target 440, e.g., a ground vehicle, in an effort to get close enough to effectively deploy a payload, such as detonating a warhead, dropping a beacon, or dispensing a pigment, and/or effect a collision with the target. Prior to deploying the payload, the UAV 410 may receive a mode transition signal 451 from the command node 450, and the UAV 410, responsive to the mode transition signal 451, returns to the previous target search, loiter, surveillance, reconnaissance or observation mode 420 (or at least substantially the same), or a new target search, loiter, surveillance, reconnaissance or observation mode 460.

In embodiments, in either of the previous mode 420 or the new mode 460, with the UAV 410 in a banked turn a side positioned or facing sensor, such as the side sensor 115 set forth herein, that is positioned on the UAV 410 towards the inside of the banked turn may be capable of viewing a ground target 490 positioned generally at the center of the turn. Then when the UAV transitioned into the terminal homing mode 430, the UAV may switch to a front positioned or facing sensor, such as sensor 111 (FIG. 2A) set forth herein. In other embodiments while in mode 420 and/or mode 460, the UAV 410 could switch between different sensors, such as side and front cameras, to maintain observation of a target.

The UAV may engage in terminal homing air-to-air mode with an air vehicle such as a helicopter 470 and the command node may be airborne 480. Responsive to signal to go into the terminal homing air-to-air mode, the UAV may employ or switch to a guidance sensor better suited for terminal homing air-to-air mode target tracking. The UAV 410 may then home on the air target 470 in an effort to get close enough to effectively deploy a payload, such as detonating a warhead, and/or to effect a collision with the air target 470. Prior to deploying the payload, the UAV 410 may receive a mode transition signal 481 from a command node such as the airborne command node 480. The UAV 410, responsive to the mode transition signal 481, returns to the previous surveillance mode 420, or a new or alternate target search mode, or loiter mode 460. A mission may be defined as a series of events, modes, and/or objectives executed, performed, and achieved, in the course of a sortie, or while the UAV is in flight and operative. During a mission, the UAV, in some embodiments, may receive multiple mode transmission signals and perform multiple mode transitions. In some embodiments the terminal homing mode may be terminated upon warhead detonation or contact with the target, contact with the ground, or an air-to-air miss.

The ability of the UAV 410 to switch between modes of operation, whether once or repeatedly, allows the operator of the UAV to perform a relatively broad field-of-view surveillance from a stand-off distance for a period of time, and also to perform close approaches, on one or more occasions, to obtain more detailed information. With the UAV in the surveillance position, the broad or wide field view that the operator is provided allows the operator to form a comprehensive or strategic understanding of the area under surveillance and events occurring therein. That is, the operator can view not only the particular potential target, but also the surrounding area, i.e., an area that may include a number of other possible targets and the proximity of non-combatants. This gives the operator flexibility as the options of UAV use, and accompanying available actions. For example, with the UAV in the surveillance mode and at a relatively high altitude, the operator can watch a building and the area around it to observe the arrival or departures of vehicles and personnel, and do so prior to making a decision as to whether to engage the UAV, and if so, which object is to be targeted.

However, given the inherent limitations of a relatively small fixed camera (with no or limited pan-tilt-zoom capabilities), such as that which is usable on small and/or man-portable UAVs, as that described herein, the amount of detail provided while the UAV is in a surveillance position may be insufficient to meet the operators needs for decisions to initiate engagement and targeting. That is, while the detail may be enough to select a particular building or area, it may not be sufficient to allow for selection or differentiation of a particular vehicle or animate object.

In such a case, embodiments of the present invention allow the operator to initiate a terminal homing mode to direct the UAV 410 toward a selected/designated target in order to obtain greater detailed information as the UAV approaches the target. During this approach, the operator may use this detailed information in many different ways including confirming selection or de-selection of the initial target, selecting another target, evaluating the chosen approach, and/or other potential target approaches, obtaining a better understanding of the target or target area, identifying a specific person, vehicle, building, or other item, or other such action. As noted herein, during this terminal homing phase the operator and/or the UAV's processor can command a mode change to have the UAV 410 transition from terminal homing back to a surveillance or target search mode. During the course of a mission the operator may engage in several terminal homing approaches, knowing that it will be transitioned out of prior to reaching the potential target or payload deployment, in order to gain the desired information on the potential target or targets and/or the surrounding area.

Figure 5:
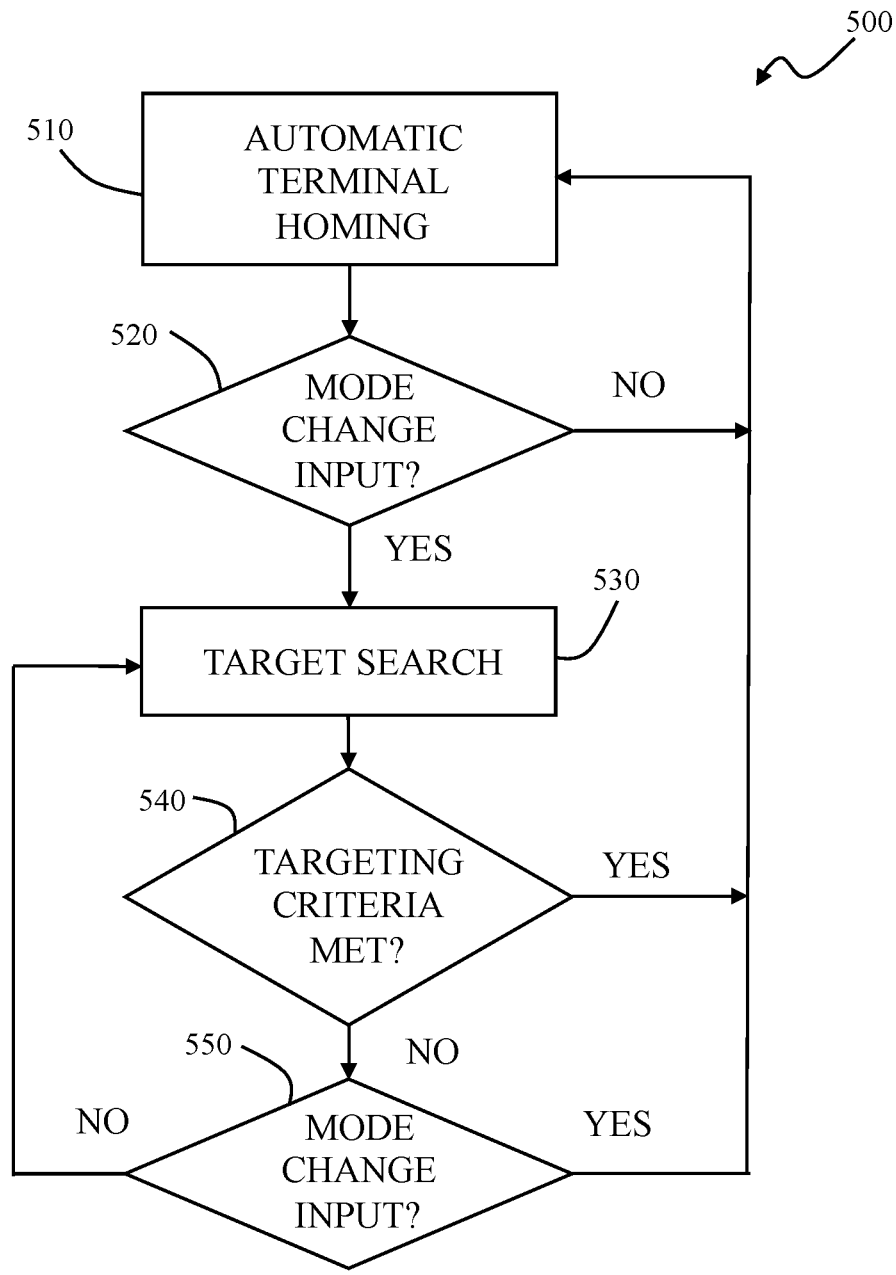
FIG. 5 is a top level flowchart of an exemplary mode logic of an embodiment of the present invention.

FIG. 5 is a top level flowchart 500 illustrating an example of the logic of the mode transition. The UAV may be in an automatic terminal homing mode 510 and continually checking for a mode change input 520. In this example, if a mode change command signal from an external source is received prior to payload deployment, the UAV may transition to the target search/surveillance mode 530, or loiter mode, without deploying the payload. The UAV mode logic processing may continue in this mode 530 until, for example, one or more targeting criteria are met 540 to initiate automatic terminal homing, or the UAV may be placed into terminal homing via an up-linked command 550. The terminal mode may include strike, i.e., ground target intercept, and/or air-to-air intercept or payload deployment sub-modes, and payload deployment sub-modes modes may include sub-sub-modes e.g., sub-sub-modes may include beacon deployment followed by pigment dispersal.

Figure 6:
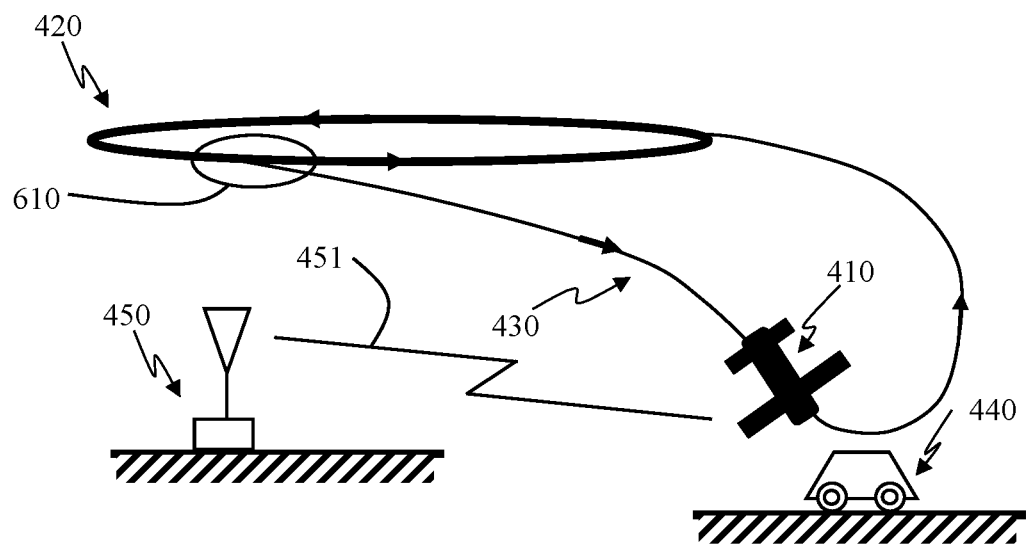
FIG. 6 is another exemplary depiction of operational deployments of an embodiment of the present invention.

Some embodiments as illustrated in FIG. 4 further include processing configured to store the three-space, e.g., xyz, north-east-down (NED), coordinates of a return point, e.g., a post-homing waypoint, and/or a commit point. For example, FIG. 6 illustrates a UAV 410 that may be in a racetrack, circular or other pattern of flight 420 as part of a target search, surveillance/reconnaissance mode, a loiter mode and/or observation mode. The seeker, or seekers processing together with the guidance processing and/or an uplink from a command node, e.g. a ground command node 450, may place the UAV 410 into a terminal homing strike mode 430 at a commit point 610 or commit volume in space. The commit point 610 or space may include an orientation of the UAV to place on target or at least to position the UAV such that the UAV homing and/or targeting sensor may be capable of acquiring or imaging the target for tracking. The UAV 410 then homes with respect to the ground target 440, e.g., a ground vehicle. Prior to deploying the payload, the UAV 410 may receive a mode transition signal 451 from the command node 450, and the UAV 410, responsive to the mode transition signal 451, would then return to the previous target search or reconnaissance/surveillance or loiter mode 420 or to a new target search or reconnaissance/surveillance mode (not shown), or loiter mode 460, as illustrated in FIG. 4, and particularly may return to a commit volume or commit point 610, or at least substantially to this volume or point. Another option for processing, for example, is for the UAV to head to a new location for the loiter and/or commit point, e.g., a new commit point that most closely and/or most quickly puts the UAV back on target, or at least sufficiently repositioned so that the homing and/or targeting sensor may be capable of acquiring or imaging the target. For example the UAV may be directed to a new position that allows the operator view, via a display of a down-linked feed originating from the camera onboard the UAV, the target and initiate an attack on the target. The orientation of the UAV at the commit point 610 aids the homing/targeting sensor and/or pilot of the UAV to re-engage the target. In embodiments when the UAV reaches or nears the loiter and/or commit point 610, the UAV can inform the user via a downlink, for example. Accordingly, an operator may receive increased views of the region of interest via the down-linked feed, that may enhance the situational awareness of the operator and thereby reduce the time required by the operator to discern a viable target on which to engage terminal homing.

Figure 7:
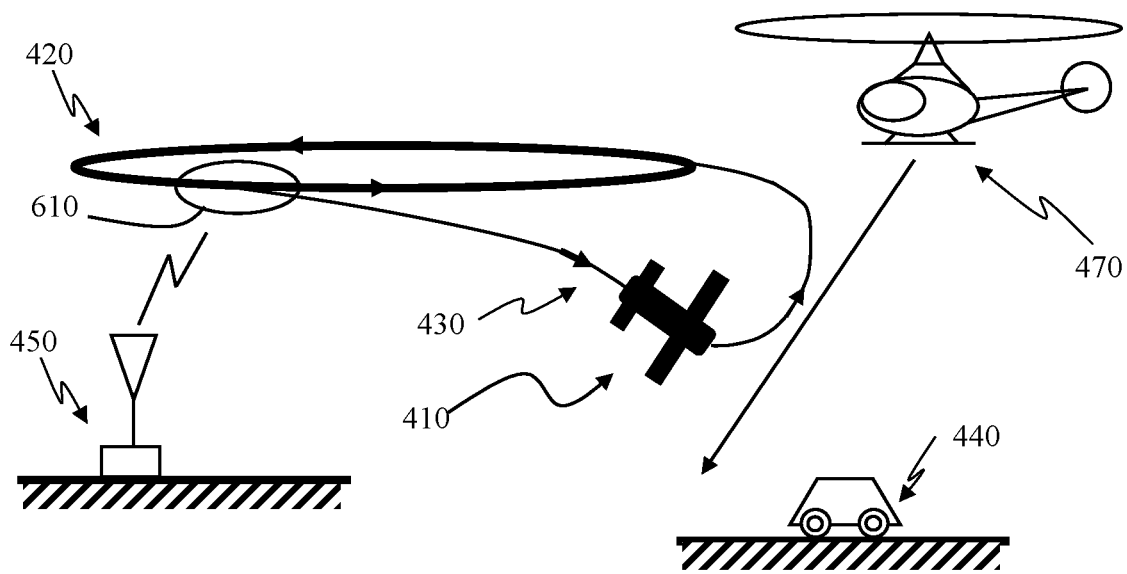
FIG. 7 is another exemplary depiction of operational deployments of an embodiment of the present invention.

Some embodiments as previously illustrated in FIG. 4 further include processing configured to store the three-space, e.g., xyz, NED, coordinates of a return point, e.g., a post-homing waypoint, and/or a commit point. For example, FIG. 7 illustrates a UAV 410 that may be in a racetrack, circular or other pattern of flight 420 as part of a surveillance/reconnaissance, target search mode, or a loiter mode. The target sensor processing together with the guidance processing and/or an uplink from a command node, e.g. a ground command node 450, may place the UAV 410 into a terminal homing strike mode 430 at a commit point 610 or at a commit volume in space. The UAV 410 then homes with respect to the ground target 440, e.g., a ground vehicle. Prior to deploying the payload, the UAV 410 may autonomously place itself into mode transition and return to the previous surveillance mode 420 or a new target search, reconnaissance/surveillance, or loiter mode 460, as illustrated in FIG. 4, and particularly may return to a commit volume or commit point 610. For example, a helicopter 470 may fly between the target vehicle 440 and the UAV 410. The image processing onboard the UAV may detect an abrupt change in target seeker image content and autonomously change flight mode to return to the commit volume 610 or mode 420. For example, the image processing may include a threshold test where frame-to-frame changes, or changes across several frames, in pixel states, or portions of frame-to-frame changes in pixel states are determined, and if above a threshold level representative of clear sky (VFR) navigation plus minor weather condition effects, then the threshold may represent object obscuration of the target, e.g., an air vehicle interposing itself between the target and the homing UAV, and/or the threshold may represent the target area masking itself, e.g., via a smoke screen or the target moving into defilade. Other tests may include thresholding and testing based on changes in the image via frame-to-frame changes, or changes across several frames, in discrete Fourier transforms (DFTs) of a portion of an image, e.g., in the region of an image containing the target, abrupt changes in the DFTs between frames or across several frames may indicate obscurations necessitating a transition from terminal homing to a reconnaissance mode.

Figure 8:
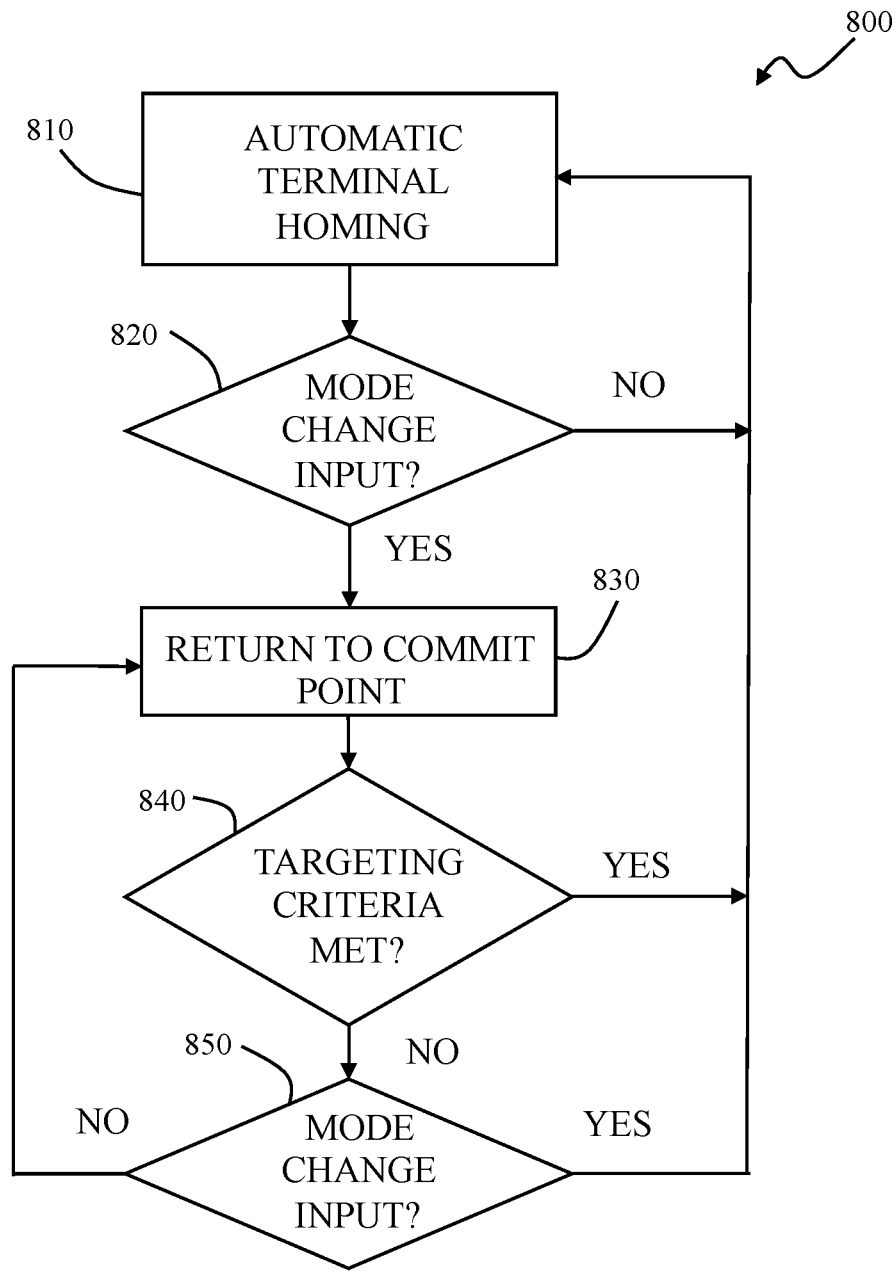
FIG. 8 is another top level flowchart of an exemplary mode logic of an embodiment of the present invention.

FIG. 8 is a top level flowchart 800 illustrating an example of the logic of the mode transition. The UAV may be in an automatic terminal homing mode 810 and continually checking for conditions to set a mode change 820. In this example, the UAV may process all or a portion of the images received via an onboard camera, and may test whether scene content has changed significantly in a set period of time prior to payload deployment. If not, the image processing may set a mode change flag that may transition the flight mode to a terminal homing commit volume 830 that may have been saved, or a target search reconnaissance/surveillance or loiter mode, without deploying the payload. The UAV mode logic processing may continue in this mode 830 until, for example, one or more targeting criteria are met 840 to initiate automatic terminal homing, or the UAV may be placed into terminal homing via an up-linked command 850. An example of a scene change test may include a minimum percentage of pixels swinging through a percentage of sensed intensity range over a set of frames. Abrupt intensity changes in a field of the image, particularly proximate to the region covered by an image tracker may indicate an object disposed between the target and the UAV or a false positive tracking solution. Another example of a scene change test may be comparisons of two-dimensional frequency transforms of portions of an image at selected intervals to determine whether significant scene composition changes have occurred. Abrupt changes in the frequency content of a portion of an image, i.e., changes in image complexity, particularly proximate to a region covered by an image tracker may indicate an object disposed between the target and the UAV or a false positive tracking solution. Embodiments of the UAV have onboard processing that allows the UAV to continue the mission and possibly change the mode back to surveillance in the event of a loss of signal contact with the operator. For example, a ground-based operator, via user interface and uplink, may designate a target, and, responsive to the designation, the UAV may then initiate the terminal homing phase. As the UAV gets closer to the ground, the line-of-site between the operator and the UAV may become lost, e.g., due to mountains and/or trees. The loss of line-of-sight communication may trigger the UAV, via the onboard processing, to change the mode out of terminal phase, and bring the UAV back to a surveillance mode at an altitude sufficient to regain a line-of-sight signal connection. The UAV may record onboard one or more image frame at or after the point or detecting a break in the line-of-sight communication, and once line-of-sight communication is restored, the UAV may transmit via downlink the one or more stored frames.

Because the processing necessary to control and direct or navigate the UAV is entirely located on-board the UAV, the UAV can operate independently from a remote user, operator or off-board processor. That is, the operation of the UAV is not dependent on maintaining a communication link with a separate off-board processor and/or operator. In embodiments the on-board processor is programmed so that after loss of communication with an operator the UAV maintains its current mode or automatically transitions to a pre-defined separate or alternate mode, and/or defined series of actions or modes. For example, a UAV in a terminal homing mode on a target can be programmed to maintain the terminal homing if the communication signal is interrupted. In this manner the UAV's on-board processing and systems can direct the UAV so that it continues and completes the terminal homing and delivers a payload autonomously without any additional input or direction from the operator, user and/or an off-board processor.

The UAV embodiments may include an onboard power source, such as a battery, to power the processing, via for example, a power supply, and may have one or more batteries as a collective power source for the circuitry of one or more electromechanical actuators and the propeller drive circuitry. The airspeed of embodiments of the UAV may be in the range of 50-120 knots. Accordingly, the UAV may be sized to have a magnitude lateral acceleration, with reference to its velocity vector, of greater than a ground vehicle and may be additionally sized to have a lateral acceleration, i.e., acceleration normal to the vehicle centerline, greater than that of a slowly maneuvering target. For example, a ground vehicle may accelerate or decelerate at 0.1 Gs and higher if braking, where G is the nominal acceleration of gravity, and a helicopter may accelerate or decelerate at 0.3 Gs and higher if climbing or diving. The aerodynamic responsiveness, or maneuver responsiveness, of the UAV may be characterized by a maneuver time constant defined by the time it takes the UAV to achieve 63% of a commanded lateral acceleration. For UAV applications against maneuvering targets, i.e., those targets during the terminal homing phase that are changing the orientation and/or magnitude of their velocity vector that may be characterized by an evasion time constant, the UAV maneuver time constant may be smaller than the target evasion time constant. For example, a ground vehicle having a human operator may decelerate with an evasion time constant of three seconds, and accordingly, a successful terminal homing UAV may have a maneuver time constant smaller than the three seconds in order to realign the direction of the velocity of the UAV to effect a collision and/or to approach sufficiently close to the target as the payload and/or warhead may require for mission effectiveness.

Terminal homing trajectories may be initiated with a time-to-intercept or time-to-impact of greater than ten times the maneuver time constant of the UAV. The UAV may be placed into a terminal homing mode toward an aim point at two to 30 seconds until the closest approach to the aim point is achieved. A human operator may add 0.5 to 1.5 seconds to the timeline for generating a break from the terminal homing mode. So, an input from the user, or the tripping of an automated tracker threshold at three seconds until the closest approach to the target, may be sufficient time for the UAV to maneuver, optionally under powered flight, away from the target and toward a waypoint. The onboard UAV energy is sufficient such that the execution of an almost completed terminal homing phase, i.e., a homing trajectory phase lasting several maneuver time constants, leaves enough energy onboard that may be drawn by the UAV to place itself into a target search, reconnaissance, surveillance and/or loiter trajectory or flight path. Some embodiments of the UAV may execute the terminal phase of flight in a mode that provides less than or no power to the propeller motor. The UAV may power the propeller motor to execute a maneuver discontinuing the terminal phase. The propulsive power available to the exemplary UAV is greater than the level required for level flight, facilitating the option of the UAV returning to a waypoint or flight pattern, such as a target search, reconnaissance, surveillance and/or loiter trajectory or mode, after discontinuing the terminal phase. That is, during the transition from target homing back to a target search, reconnaissance, surveillance and/or loiter mode, embodiments of the UAV are capable of converting stored chemical energy, e.g., a battery store and/or a fuel reservoir, into vehicle potential energy via increased altitude, and kinetic energy via increased speed.

Figure 9:
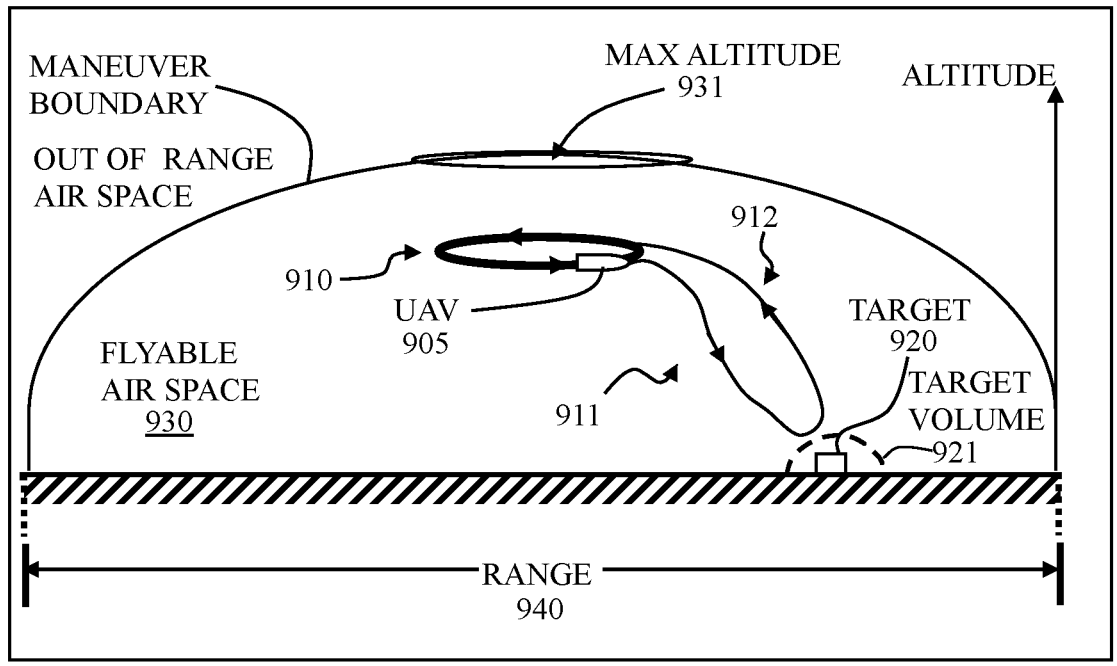
FIG. 9 is an exemplary depiction of a UAV in a racetrack pattern transitioning to homing on a ground target, breaking from terminal homing, and returning to a racetrack pattern.

FIG. 9 depicts an UAV 905 in a racetrack pattern 910 that transitions to homing 911 on a ground target 920, and either autonomously or via a third party, breaks from terminal homing and returns 912 to a racetrack pattern 910. The flyable airspace 930 is depicted as a dome-like volume limited by the on-board power of the UAV 905, and the maximum altitude capability 931 of the UAV 905. Due to its maneuverability, on-board power, and ability to convert between potential and kinetic energy, the UAV 905 depicted in this example has the capacity and capability to utilize the flyable airspace 930 in a variety of ways to facilitate the needs and/or requirements of its mission and/or its operator. For example, the UAV 905 may move within the flyable airspace 930 to perform target search, reconnaissance, surveillance, loiter, and/or otherwise to observe the target 920 at a distance, or wait to begin the homing engagement 911 of the target 920, the UAV 905 may enter one or more homing phases 911 to engage or evaluate the target, or the UAV may reposition itself through via any path, such as path 912 to achieve a desired attitude/altitude and/or approach angle and/or direction to a target 920 in a target volume 921. One may note that each of such examples or other similar actions may be achieved at any of a practicably or effectively unlimited number of differing altitudes, attitudes, specs and locations, albeit within the flyable airspace 930. As the UAV 905 continues to fly in the flyable airspace 930, and as the onboard power is drained, the radius of the ground footprint (lineally expressed as range 940 in the depiction of FIG. 9) of the flyable air space 930 of the UAV 905 will monotonically diminish. For example, an exemplary UAV embodiment in a range of 1.0 to 2.0 kilograms mass, having a lithium battery storing 40-50 watt-hour battery may be tube-launched using one or more gas-generating elements within the tube to effect a tube exit velocity of 60-120 mph, and the UAV, using an electrically powered propeller may maintain a shrinking flyable space 930 in the face of repeated terminal engagements and homing aborts to reconnaissance altitudes for about ten to 30 minutes.

Figure 10:
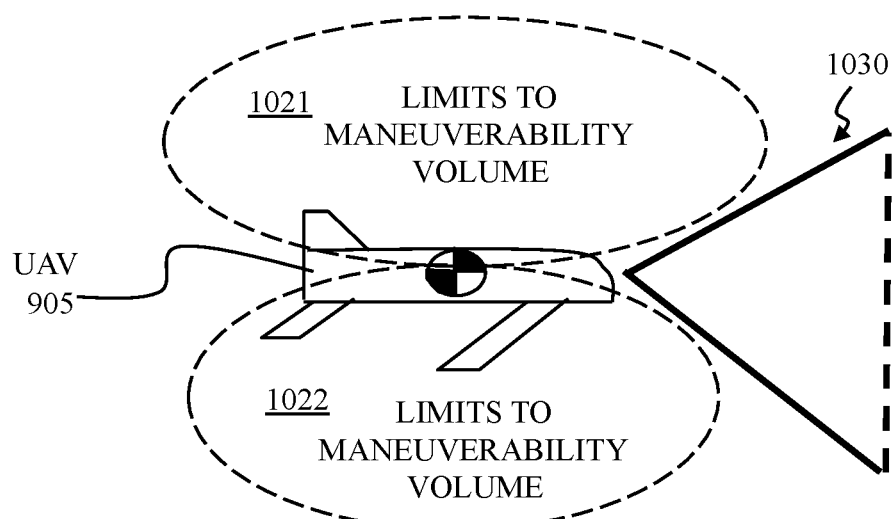
FIG. 10 depicts an exemplary volume of space denied to a UAV due to the vehicle's maneuver limits.

It should be noted, as shown in FIG. 10, that while the a UAV 905 may utilize all the flyable airspace, it is limited in its ability to maneuver as defined and may be depicted by a toroidal volume, shown here in FIG. 10 in cross-section as ellipses 1021, 1022. Powered flight and the energy monitoring and management practiced by the UAV enables the UAV to avoid a conic or otherwise limited maneuver envelope—depicted in a plane as approximately as a skewed triangular region 1030—during almost all of its flight time, except very late in the terminal homing phase or very late in its available flight time—as limited by battery life and potential and kinetic energy.

Unlike guided bombs and missiles where due to their inherent lack of maneuvering and/or lack of sufficient available and/or applicable energy, which defines a fixed and/or closed maneuver cone that projects from the bomb or missile, that is bounded by the limits of its maneuverability and terminates at the ground, a structure, or other impassable object, the UAV of the embodiments of the present invention has sufficient maneuverability and available and/or applicable energy to allow it to move freely anywhere within a given area or volume, such as that shown in FIGS. 9 and 10. That is, in embodiments of the present invention the UAV can enter into a terminal homing mode, which directs the UAV towards the ground, or other impassable object, i.e. via the homing to a target on the ground, in a manner generally similar to the operation of a guided bomb or a missile, but unlike a guided bomb or missile, the UAV does possess sufficient maneuverability and applicable energy to avoid impact with the ground or other impassable object that it is targeting. That is the UAV of embodiments of the present invention is not initially and/or always limited in its movement to a closed maneuver limit cone that requires it to intersect or impact the ground or the impassable object, such as the case with a guide bomb or missile. In contrast the UAV has the maneuvering and can apply sufficient energy to allow it to be lifted via a divert or escape trajectory, e.g., when the UAV is transitioning from a terminal homing mode to a target search, reconnaissance, surveillance and/or loiter mode, to avoid, at least once and potentially many times, from impacting the ground, target or other impassable object.

That is, guided bombs, or missiles homing on a ground target, will necessarily impact either the target or a nearby point within the ground footprint of the maneuver cone, which is characteristic of the maneuver limitations of the particular guided bomb or missile. In contrast, UAV embodiments of the present invention which are in a terminal homing mode may disengage and maneuver up and away from the ground target. Thereafter, the UAV embodiments may conduct reconnaissance, re-engage the original target, or engage a second target by transitioning into a separate or new terminal homing mode to that second target.

Figure 11:
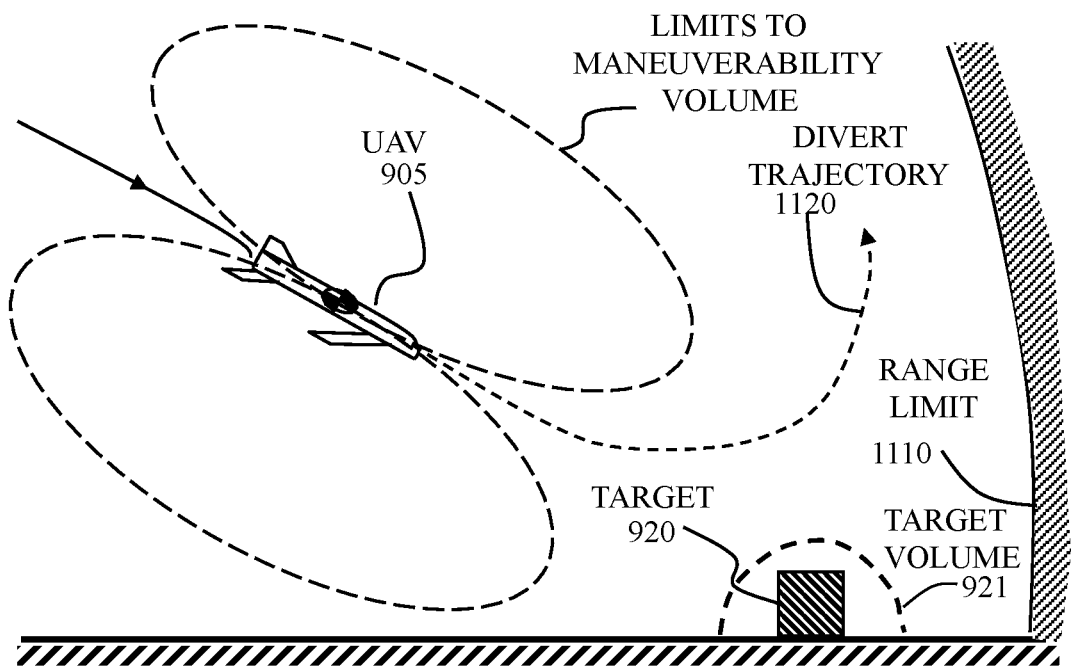
FIG. 11 depicts an exemplary UAV having maneuver and range limits in an early terminal homing phase.

For example, FIG. 11 depicts a UAV 905 in a terminal homing phase where the target 920 in the target volume 921 is within both the range limit 1110 of the UAV and the maneuver capability of the UAV. Accordingly, the UAV may timely discontinue the terminal homing phase and fly—via an exemplary divert trajectory 1120—to a higher altitude, thereby potentially converting some of its kinetic energy to potential energy, and potentially adding energy from an application of thrust, such as from operation of a propeller, which may be generated from an on-board power source, such as a chemical battery. UAV embodiments comprise onboard power sources, e.g., a chemical battery such as a lithium battery, sufficient for the UAV to return to a surveillance altitude, or higher, as needed. That is, if during the dive and recovery there was just a potential to kinetic to potential energy conversation, e.g. there was no addition of thrust from a propeller added, then the energy losses, e.g., air drag, would reduce the overall energy that the UAV had and prevent the UAV from returning to the same altitude and speed the UAV had at the beginning of the terminal homing phase or dive. In contrast to guided bombs and strike missiles, UAV embodiments of the present invention are configured to transfer power from the battery to the flight energy of the UAV, and as such the UAV can achieve the same, or greater altitude and speed as the UAV had at the start of the terminal homing phase or mode or dive.

Figure 12:
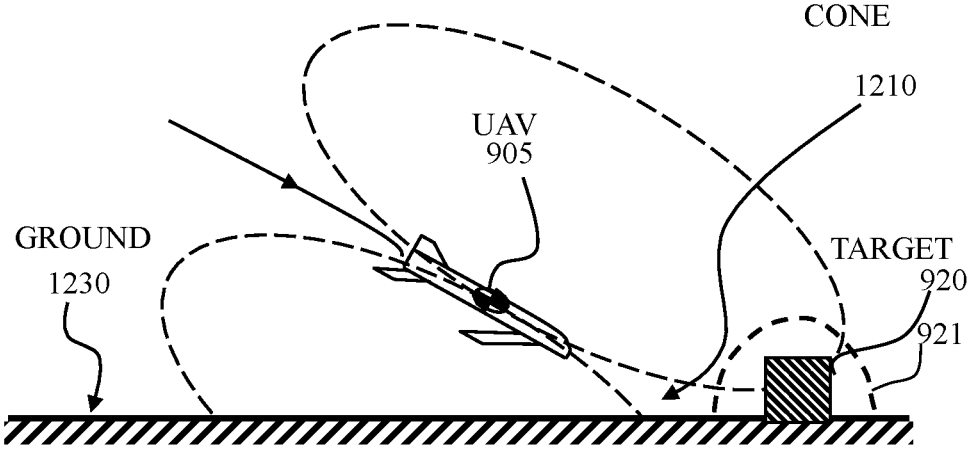
FIG. 12 depicts a UAV having maneuver and range limits in a later terminal homing phase.

FIG. 12 depicts the circumstances where even with powered flight and energy monitoring and management, the UAV 905 during the last few maneuver time constants will be limited by a maneuver limit cone 1210. Accordingly, FIG. 12 depicts a UAV 905 having maneuver limitations due to the constraints of the vehicle-target geometry and the lateral acceleration of the UAV 905 itself. In this depiction of FIG. 12, the exemplary UAV 905 may be expected to be unable to return to a target search, reconnaissance, surveillance, or loiter mode and may either impact the target 920 in the target volume 921 or the ground 1230. That is, the lateral maneuverability of the exemplary UAV 905 as depicted, both in terms of responsiveness and maximal lateral acceleration, is insufficient for the closing speed and range to the target to effect a successful divert maneuver.

In embodiments of the present invention a closed maneuver cone bounded by the UAV's maneuver limits and a impassable object such as the ground and/or the target, such as that shown by the maneuver limit cone 1210, will be formed and the UAV will be unable to achieve an escape trajectory, such as that shown the divert trajectory 1120, when the time to the UAV's impact to the target, ground or impassable object is about two to three seconds. In embodiments of the present invention a closed maneuver cone bounded by the UAV's maneuver limits and an impassable object such as the ground and/or the target, such as that shown by the maneuver limit cone 1210, will be formed and the UAV will be unable to achieve an escape trajectory, such as that shown in the divert trajectory 1120, when the UAV is at a distance from the target, ground or impassable object of about the UAV's velocity times about two to three seconds.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. An unmanned aerial vehicle (UAV) comprising:
a processing unit which transitions the UAV from a first trajectory to impact a target to a second trajectory to avoid impact of the target by the UAV, wherein the transition is responsive to an indicator generated by onboard processing of the processing unit as an autonomous determination of scene change.

2. The UAV of claim 1 wherein the processing unit maintains a divert trajectory outside of a closed maneuver limit cone while in the first trajectory.

3. The UAV of claim 2 wherein the UAV transfers power from a battery of the UAV to a flight energy of the UAV in the divert trajectory, wherein the divert trajectory transitions the UAV from the first trajectory to the second trajectory, and wherein the UAV achieves at least an altitude in the second trajectory as the altitude at a start of the first trajectory.

4. The UAV of claim 2 wherein the processing unit stores at least one of: a pre-terminal commit point and a return waypoint, wherein the processing unit transitions the UAV to at least one of: the pre-terminal commit point and the return waypoint in response to an external command to transition the UAV from the first trajectory to the second trajectory.

5. The UAV of claim 4 wherein the external command causes the processing unit to transition from the first trajectory to the second trajectory, and wherein the external command is received via an uplink receiver.

6. The UAV of claim 2 further comprising:
one or more sensors, wherein the one or more sensors detect at least one of: a UAV position, a UAV linear velocity, a UAV rotational velocity, a UAV linear acceleration, and a UAV attitude.

7. The UAV of claim 2 wherein the processing unit transitions the UAV from the first trajectory to the second trajectory via the divert trajectory.

8. The UAV of claim 2 wherein the first trajectory further comprises homing on a target to deliver a payload into a target volume.

9. The UAV of claim 8 wherein the second trajectory avoids the UAV impacting the target volume.

10. The UAV of claim 8 wherein the second trajectory avoids the UAV impacting at least one of: the target the UAV is homing on and the ground.

11. The UAV of claim 2 wherein the divert trajectory is outside of a toroidal volume disposed about the UAV.

12. The UAV of claim 1 wherein the processing unit comprises at least one of: a central processing unit configured to execute computer-executable instructions; electrical circuitry; electronic circuitry; and a logical gate array.

13. The UAV of claim 1 wherein the indicator is received autonomously based on one or more image change conditions detected via a UAV onboard targeting sensor.

14. A method comprising:
transitioning, by a processing unit, an unmanned aerial vehicle (UAV) from a first trajectory to impact a target to a second trajectory avoiding impact of the target by the UAV, wherein the transition is responsive to an indicator generated by onboard processing of the processing unit as an autonomous determination of scene change.

15. The method of claim 14 further comprising:
maintaining, by the processing unit, a divert trajectory outside of a closed maneuver limit cone while in the first trajectory.

16. The method of claim 15 further comprising:
transferring power from a battery of the UAV to a flight energy of the UAV in the divert trajectory, wherein the divert trajectory transitions the UAV from the first trajectory to the second trajectory.

17. The method of claim 16 wherein the UAV achieves at least an altitude in the second trajectory as the altitude at a start of the first trajectory.

18. The method of claim 15 wherein the first trajectory further comprises homing on a target to deliver a payload into a target volume, and wherein the second trajectory avoids the UAV impacting at least one of: the target the UAV is homing on and the ground.

19. The method of claim 14 further comprising:
testing, by the processing unit, for the indicator while in the first trajectory.

20. The method of claim 19 further comprising:
receiving the indicator autonomously based on one or more image change conditions detected via a UAV onboard targeting sensor.

* * * * *